(12) United States Patent
Ye

(10) Patent No.: US 11,035,438 B2
(45) Date of Patent: Jun. 15, 2021

(54) TRANSMISSION MECHANISM, FOLLOW FOCUS, FOLLOW FOCUS ACTUATOR, AND IMAGING DEVICE

(71) Applicant: SZ DJI OSMO TECHNOLOGY CO., LTD., Shenzhen (CN)

(72) Inventor: Fangming Ye, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/579,354

(22) Filed: Sep. 23, 2019

(65) Prior Publication Data

US 2020/0018379 A1 Jan. 16, 2020

Related U.S. Application Data

(63) Continuation of application No. 15/958,692, filed on Apr. 20, 2018, now Pat. No. 10,443,687, which is a (Continued)

(51) Int. Cl.
*F16H 1/16* (2006.01)
*F16H 1/06* (2006.01)
*G03B 13/18* (2021.01)
*G03B 13/34* (2021.01)
*G03B 17/56* (2021.01)
(Continued)

(52) U.S. Cl.
CPC .............. *F16H 1/166* (2013.01); *F16D 1/101* (2013.01); *F16H 1/06* (2013.01); *F16H 57/0025* (2013.01); *G03B 13/18* (2013.01); *G03B 13/34* (2013.01); *G03B 17/56* (2013.01); *F16H 37/041* (2013.01);
(Continued)

(58) Field of Classification Search
CPC ........ F16H 1/166; F16H 1/06; F16H 57/0025; F16D 1/101; G03B 13/18; G03B 13/34; G03B 17/56; G03B 13/32
See application file for complete search history.

(56) References Cited

U.S. PATENT DOCUMENTS 6,266,124 B1 * 7/2001 Wallner .................... G03B 3/02
352/139
2009/0002825 A1 * 1/2009 Morita ............... H04N 5/23258
359/554
(Continued)

FOREIGN PATENT DOCUMENTS

CN 2385354 Y 6/2000
CN 2821290 Y 9/2006
(Continued)

OTHER PUBLICATIONS

The World Intellectual Property Organization (WIPO) International Search Report for PCT/CN2015/092466 dated Jul. 27, 2016 8 Pages (including translation).

*Primary Examiner* — Nicholas G Giles
(74) *Attorney, Agent, or Firm* — Anova Law Group, PLLC

(57) ABSTRACT

A transmission mechanism includes an output member and a worm wheel shaft configured to be connected to a power device to transmit a power of the power device to the output member. The worm wheel shaft and the output member are engaged with each other through a relative movement along an axial direction. An engagement between the worm wheel shaft and the output member limits a relative rotation between the worm wheel shaft and the output member.

17 Claims, 14 Drawing Sheets

Related U.S. Application Data continuation of application No. PCT/CN2015/092466, filed on Oct. 21, 2015.

(51) Int. Cl.
  *F16D 1/10* (2006.01)
  *F16H 57/00* (2012.01)
  *F16H 57/02* (2012.01)
  *F16H 37/04* (2006.01)
  *F16H 57/039* (2012.01)
  *F16H 57/021* (2012.01)

(52) U.S. Cl.
  CPC .......... *F16H 57/021* (2013.01); *F16H 57/039* (2013.01); *F16H 2057/02034* (2013.01)

(56) References Cited

U.S. PATENT DOCUMENTS

| | | | |
|---|---|---|---|
| 2010/0259669 A1* | 10/2010 | Wood | G03B 17/56 348/345 |
| 2012/0033956 A1* | 2/2012 | Chen | G03B 3/04 396/89 |
| 2012/0279335 A1 | 11/2012 | Wong et al. | |
| 2013/0271619 A1 | 10/2013 | Longmore et al. | |
| 2015/0131983 A1 | 5/2015 | Thayer et al. | |
| 2017/0276898 A1 | 9/2017 | Turner et al. | |

FOREIGN PATENT DOCUMENTS

| | | |
|---|---|---|
| CN | 101403418 A | 4/2009 |
| CN | 101842748 A | 9/2010 |
| CN | 101876808 A | 11/2010 |
| CN | 102233564 A | 11/2011 |
| CN | 102764511 A | 11/2012 |
| CN | 203259754 U | 10/2013 |
| CN | 103869442 A | 6/2014 |
| CN | 103872845 A | 6/2014 |
| CN | 104049441 A | 9/2014 |
| CN | 203894524 U | 10/2014 |
| CN | 203950104 U | 11/2014 |
| CN | 204069143 U | 12/2014 |
| CN | 104669218 A | 6/2015 |
| CN | 303248952 S | 6/2015 |
| CN | 205173424 U | 4/2016 |

\* cited by examiner

TRANSMISSION MECHANISM, FOLLOW FOCUS, FOLLOW FOCUS ACTUATOR, AND IMAGING DEVICE

CROSS-REFERENCE TO RELATED APPLICATIONS

This application is a continuation of application Ser. No. 15/958,692, filed Apr. 20, 2018, which is a continuation of International Application No. PCT/CN2015/092466, filed on Oct. 21, 2015, the entire contents of both of which are incorporated herein by reference.

TECHNICAL FIELD

The present disclosure relates to a transmission mechanism, a follow focus, a follow focus actuator and an imaging device.

BACKGROUND OF THE DISCLOSURE

A follow focus can comprise a motor and an output gear coupled to the motor. The output gear can be sleeved on a rotating shaft of the motor and coupled to the rotating shaft by a fastening screw, such that a torque can be transmitted from the motor to the output gear through the rotating shaft. An end of the fastening screw can pass through the output gear along a radial direction of the rotating shaft and can be then mounted in the rotating shaft. An assembly and disassembly of the follow focus can be inconvenient as specific tools are required.

SUMMARY OF THE DISCLOSURE

There is a need for a transmission mechanism, a follow focus, a follow focus actuator and an imaging device that can be conveniently assembled and disassembled.

An aspect of the present disclosure provides a transmission mechanism for transmitting a power of a power device, the transmission mechanism comprising an adaptor and an output member, the adaptor being connected to the power device and transmitting the power of the power device to the output member, the output member outputting the power, the adaptor driving a coaxial rotation of the output member by a rotation of the adaptor to output the power. The adaptor and the output member can be engaged with each other through a relative movement along an axial direction. The engagement can limit a relative rotation between the adaptor and the output member. The transmission mechanism can further comprise a locking member rotatably provided on the output member, the locking member passing through the output member along an axial direction of the output member and comprising an operating portion. The operating portion can be operable to connect the locking member with the adaptor or disconnect the locking member from the adaptor. The relative movement between the adaptor and the output member along the axial direction can be limited when the locking member are connected to the adaptor.

In some embodiments, the adaptor can comprise an engaging portion. The output member can comprise a holding portion. The engaging portion can abut against the holding portion or release from the holding portion to bring the transmission mechanism into an assembled state or a disassembled state.

In some embodiments, the output member can comprise a holding member and an output gear connected to the holding member. The holding member can abut against the adaptor or release from the adaptor to bring the transmission mechanism into the assembled state or the disassembled state. The output member can output the power to a load through the output gear.

In some embodiments, the holding portion can be formed on the holding member.

In some embodiments, the engaging portion can comprise a plurality of protruding blocks, a slot being formed between two adjacent protruding blocks. The holding portion can comprise a plurality of protrusions corresponding to the slots. The protrusions can engage into or disengage from the corresponding slots to cause the engaging portion abut against the holding portion or release from the holding portion.

In some embodiments, the adaptor can comprise a transmission shaft. The engaging portion can be provided at an end portion of the transmission shaft. The plurality of protruding blocks can be arranged along a circumference of an end face of the transmission shaft with an interval therebetween.

In some embodiments, two engaging portions can be respectively provided at two ends of the transmission shaft.

In some embodiments, the adaptor can further comprise a transmission wheel for connecting the power device. A mounting portion can be formed on the transmission shaft at which the transmission wheel can be provided. The mounting portion can prevent a movement of the transmission wheel relative to the transmission shaft along a circumferential direction and an axial direction of the transmission shaft.

In some embodiments, four mounting portions can be evenly arranged along the circumferential direction of the transmission shaft.

In some embodiments, the transmission wheel can comprise a plurality of gear teeth through which the transmission wheel can be meshed with the power device.

In some embodiments, an angle between a lengthwise direction of the gear teeth and an axial direction of a central axis of the transmission wheel can be an acute angle.

In some embodiments, the locking member can pass through the output gear and the holding member and be threadedly connected to or disconnected from the adaptor to cause the holding member abut against the adaptor or release from the adaptor.

In some embodiments, the locking member can comprise a connecting rod, the connecting rod being threadedly connected to or disconnected from the transmission shaft to cause the holding member abut against the adaptor or release from the adaptor.

In some embodiments, the transmission shaft can be provided with an accommodating hole. A collar can extend from a position at a middle of an inner wall of the accommodating hole, and the adaptor can be threadedly connected to or disconnected from the connecting rod through the collar.

In some embodiments, a thread can be formed on a surface of the collar facing a central axis of the transmission shaft.

In some embodiments, the holding member can be provided with a via hole, and the output gear can be provided with a through hole and a groove in communication with the through hole. The holding member can be mounted within the groove. The locking member can protrude from the holding member upon passing through the through hole and the via hole.

In some embodiments, the plurality of protrusions can be arranged along a circumference of the via hole with an interval therebetween.

In some embodiments, the holding member can be provided with a guide hole. A rib can be fixed on a bottom surface of the groove facing the holding member. The rib can be inserted into the guide hole to guide a connection between the output gear and the holding member.

In some embodiments, the output gear can comprise a meshing portion through which the output gear can drive a rotation of the load.

Another aspect of the present disclosure provides a follow focus, the follow focus comprising a casing, a power device and a transmission mechanism connected to the casing for transmitting a power of the power device, the transmission mechanism comprising an adaptor and an output member, the adaptor being connected to the power device and transmitting the power of the power device to the output member, the output member outputting the power, the adaptor driving a coaxial rotation of the output member by a rotation of the adaptor to output the power. The adaptor and the output member can be engaged with each other through a relative movement along an axial direction. The engagement can limit a relative rotation between the adaptor and the output member. The transmission mechanism can further comprise a locking member rotatably provided on the output member, the locking member passing through the output member along an axial direction of the output member and comprising an operating portion. The operating portion can be operable to connect the locking member with the adaptor or disconnect the locking member from the adaptor. The relative movement between the adaptor and the output member along the axial direction can be limited when the locking member are connected to the adaptor.

In some embodiments, the power device can be provided within the casing. The transmission mechanism can be provided on the casing through the adaptor. The transmission mechanism can be connected to the power device through the adaptor. The power device can drive a rotation of the output member through the adaptor.

In some embodiments, a clearing slot can be provided on the casing for accommodating the output member upon assembling the follow focus.

In some embodiments, two clearing slots can be provided facing away from each other.

In some embodiments, the casing can be provided with a housing hole in communication with the clearing slot. The adaptor can be mounted within the housing hole.

In some embodiments, a receiving cavity in communication with the housing hole can be formed in the casing. The power device can be received in the receiving cavity.

In some embodiments, the power device can comprise an output shaft meshed with the adaptor to drive the rotation of the adaptor.

In some embodiments, the follow focus can further comprise a latching member connected to the casing. The follow focus can be detachably connected to a carrier through the latching member.

In some embodiments, the latching member can comprise a knob movably connected to the casing, a stationary portion connected to the casing and a movable portion rotatably connected to the stationary portion. The knob can be rotatable relative to the casing to bring the latching member into a locked state or a disassembled state.

In some embodiments, the movable portion can be connected to the knob. The knob can drive a rotation of the movable portion relative to the stationary portion.

In some embodiments, a receiving hole for receiving the carrier can be formed by the movable portion and the stationary portion when the latching member is in the locked state.

In some embodiments, the adaptor can comprise an engaging portion, and the output member can comprise a holding portion. The engaging portion can abut against the holding portion or release from the holding portion to bring the transmission mechanism into an assembled state or a disassembled state.

In some embodiments, the output member can comprise a holding member and an output gear connected to the holding member. The holding member can abut against the adaptor or release from the adaptor to bring the transmission mechanism into the assembled state or the disassembled state. The output member can output the power to a load through the output gear.

In some embodiments, the holding portion can be formed on the holding member.

In some embodiments, the engaging portion can comprise a plurality of protruding blocks, a slot being formed between two adjacent protruding blocks. The holding portion can comprise a plurality of protrusions corresponding to the slots. The protrusions can engage into or disengage from the corresponding slots to cause the engaging portion abut against the holding portion or release from the holding portion.

In some embodiments, the adaptor can comprise a transmission shaft. The engaging portion can be provided at an end portion of the transmission shaft. The plurality of protruding blocks can be arranged along a circumference of an end face of the transmission shaft with an interval therebetween.

In some embodiments, two engaging portions can be respectively provided at two ends of the transmission shaft.

In some embodiments, the adaptor can further comprise a transmission wheel for connecting the power device. A mounting portion can be formed on the transmission shaft at which the transmission wheel can be provided. The mounting portion can prevent a movement of the transmission wheel relative to the transmission shaft along a circumferential direction and an axial direction of the transmission shaft.

In some embodiments, four mounting portions can be evenly arranged along the circumferential direction of the transmission shaft.

In some embodiments, the transmission wheel can comprise a plurality of gear teeth through which the transmission wheel can be meshed with the power device.

In some embodiments, an angle between a lengthwise direction of the gear teeth and an axial direction of a central axis of the transmission wheel can be an acute angle.

In some embodiments, the locking member can pass through the output gear and the holding member and be threadedly connected to or disconnected from the adaptor to cause the holding member abut against the adaptor or release from the adaptor.

In some embodiments, the locking member can comprise a connecting rod, the connecting rod being threadedly connected to or disconnected from the transmission shaft to cause the holding member abut against the adaptor or release from the adaptor.

In some embodiments, the transmission shaft can be provided with an accommodating hole. A collar can extend from a position at a middle of an inner wall of the accommodating hole. The adaptor can be threadedly connected to or disconnected from the connecting rod through the collar.

In some embodiments, a thread can be formed on a surface of the collar facing a central axis of the transmission shaft.

In some embodiments, the holding member can be provided with a via hole, and the output gear can be provided with a through hole and a groove in communication with the through hole. The holding member can be mounted within the groove. The locking member can protrude from the holding member upon passing through the through hole and the via hole.

In some embodiments, the plurality of protrusions can be arranged along a circumference of the via hole.

In some embodiments, the holding member can be provided with a guide hole. A rib can be fixed on a bottom surface of the groove facing the holding member. The rib can be inserted into the guide hole to guide a connection between the output gear and the holding member.

In some embodiments, the output gear can comprise a meshing portion through which the output gear can drive a rotation of the load.

In some embodiments, two output members can be provided each of which being detachably connected to the adaptor through the locking member. The adaptor can drive a coaxial rotation of the two output members.

Another aspect of the present disclosure provides an imaging device, the imaging device comprising a gimbal, an imaging element provided on the gimbal and a follow focus provided on the gimbal, the follow focus comprising a casing, a power device and a transmission mechanism connected to the casing for transmitting a power of the power device, the transmission mechanism comprising an adaptor and an output member, the adaptor being connected to the power device and transmitting the power of the power device to the output member, the output member outputting the power to the imaging element, the adaptor driving a coaxial rotation of the output member by a rotation of the adaptor to output the power. The adaptor and the output member can be engaged with each other through a relative movement along an axial direction. The engagement can limit a relative rotation between the adaptor and the output member. The transmission mechanism can further comprise a locking member rotatably provided on the output member, the locking member passing through the output member along an axial direction of the output member and comprising an operating portion. The operating portion can be operable to connect the locking member with the adaptor or disconnect the locking member from the adaptor. The relative movement between the adaptor and the output member along the axial direction can be limited when the locking member are connected to the adaptor.

In some embodiments, the gimbal can comprise a carrier, a carrying platform and a mounting rod provided on the carrier, a first operating handle and a second operating handle connected to the mounting rod, and a carrying rod connected to the carrying platform. The imaging element can be provided on the carrying platform. The follow focus can be connected to the carrying rod.

In some embodiments, the follow focus can comprise a gear ring. The gear ring can be sleeved on a lens ring of the imaging element. The gear ring can be meshed with the output member. The power device can drive a rotation of the gear ring through the adaptor to effect a focusing of the imaging element. Or the gear ring can be sleeved on an aperture ring of the imaging element and meshed with the output member. The power device can drive a rotation of the gear ring through the adaptor to effect an aperture adjustment of the imaging element.

In some embodiments, the power device can be provided within the casing. The transmission mechanism can be provided on the casing through the adaptor. The transmission mechanism can be connected to the power device through the adaptor. The power device can drive a rotation of the output member through the adaptor.

In some embodiments, a clearing slot can be provided on the casing for accommodating the output member upon assembling the follow focus.

In some embodiments, two clearing slots can be provided facing away from each other.

In some embodiments, the casing can be provided with a housing hole in communication with the clearing slot. The adaptor can be mounted within the housing hole.

In some embodiments, a receiving cavity in communication with the housing hole can be formed in the casing. The power device can be received in the receiving cavity.

In some embodiments, the power device can comprise an output shaft meshed with the adaptor to drive the rotation of the adaptor.

In some embodiments, the follow focus can further comprise a latching member connected to the casing. The follow focus can be detachably connected to the gimbal through the latching member.

In some embodiments, the latching member can comprise a knob movably connected to the casing, a stationary portion connected to the casing and a movable portion rotatably connected to the stationary portion. The knob can be rotatable relative to the casing to bring the latching member into a locked state or a disassembled state.

In some embodiments, the movable portion can be connected to the knob. The knob can drive a rotation of the movable portion relative to the stationary portion.

In some embodiments, a receiving hole for receiving the carrier can be formed by the movable portion and the stationary portion when the latching member is in the locked state.

In some embodiments, the adaptor can comprise an engaging portion, and the output member can comprise a holding portion. The engaging portion can abut against the holding portion or release from the holding portion to bring the transmission mechanism into an assembled state or a disassembled state.

In some embodiments, the output member can comprise a holding member and an output gear connected to the holding member. The holding member can abut against the adaptor or release from the adaptor to bring the transmission mechanism into the assembled state or the disassembled state. The output member can output the power to the imaging element through the output gear.

In some embodiments, the holding portion can be formed on the holding member.

In some embodiments, the engaging portion can comprise a plurality of protruding blocks, a slot being formed between two adjacent protruding blocks. The holding portion can comprise a plurality of protrusions corresponding to the slots. The protrusions can engage into or disengage from the corresponding slots to cause the engaging portion abut against the holding portion or release from the holding portion.

In some embodiments, the adaptor can comprise a transmission shaft. The engaging portion can be provided at an end portion of the transmission shaft. The plurality of protruding blocks can be arranged along a circumference of an end face of the transmission shaft with an interval therebetween.

In some embodiments, two engaging portions can be respectively provided at two ends of the transmission shaft.

In some embodiments, the adaptor can further comprise a transmission wheel for connecting the power device. A mounting portion can be formed on the transmission shaft at which the transmission wheel can be provided. The mounting portion can prevent a movement of the transmission wheel relative to the transmission shaft along a circumferential direction and an axial direction of the transmission shaft.

In some embodiments, four mounting portions can be evenly arranged along the circumferential direction of the transmission shaft.

In some embodiments, the transmission wheel can comprise a plurality of gear teeth through which the transmission wheel can be meshed with the power device.

In some embodiments, an angle between a lengthwise direction of the gear teeth and an axial direction of a central axis of the transmission wheel can be an acute angle.

In some embodiments, the locking member can pass through the output gear and the holding member and be threadedly connected to or disconnected from the adaptor to cause the holding member abut against the adaptor or release from the adaptor.

In some embodiments, the locking member can comprise a connecting rod, the connecting rod being threadedly connected to or disconnected from the transmission shaft to cause the holding member abut against the adaptor or release from the adaptor.

In some embodiments, the transmission shaft can be provided with an accommodating hole. A collar can extend from a position at a middle of an inner wall of the accommodating hole. The adaptor can be threadedly connected to or disconnected from the connecting rod through the collar.

In some embodiments, a thread can be formed on a surface of the collar facing a central axis of the transmission shaft.

In some embodiments, the holding member can be provided with a via hole, and the output gear can be provided with a through hole and a groove in communication with the through hole. The holding member can be mounted within the groove. The locking member can protrude from the holding member upon passing through the through hole and the via hole.

In some embodiments, the plurality of protrusions can be arranged along a circumference of the via hole.

In some embodiments, the holding member can be provided with a guide hole. A rib can be fixed on a bottom surface of the groove facing the holding member. The rib can be inserted into the guide hole to guide a connection between the output gear and the holding member.

In some embodiments, the output gear can comprise a meshing portion through which the output gear can drive a rotation of the imaging element.

In some embodiments, two output members can be provided each of which being detachably connected to the adaptor through the locking member. The adaptor can drive a coaxial rotation of the two output members.

Another aspect of the present disclosure provides a transmission mechanism for transmitting a power of a power device, the transmission mechanism comprising an output member and a worm wheel shaft connected to the power device to transmit the power of the power device to the output member. The output member can output the power. The worm wheel shaft can drive a coaxial rotation of the output member by a rotation of the worm wheel shaft to output the power. The worm wheel shaft and the output member can be engaged with each other through a relative movement along an axial direction. The engagement can limit a relative rotation between the worm wheel shaft and the output member.

In some embodiments, the transmission mechanism can further comprise a locking member rotatably provided on the output member. The locking member can pass through the output member along an axial direction of the output member. An operating portion provided on the locking member can be operated to connect the locking member with the worm wheel shaft or disconnect locking member from the worm wheel shaft. The relative movement between the worm wheel shaft and the output member can be limited when the locking member is connected with the worm wheel shaft.

In some embodiments, the worm wheel shaft can comprise an engaging portion, the output member can comprise a holding portion, and the engaging portion and the holding portion can abut against or release from each other to bring the transmission mechanism into an assembled state or a disassembled state.

In some embodiments, the output member can comprise a holding member and an output gear connected to the holding member. The holding member can abut against the worm wheel shaft or release from the worm wheel shaft to bring the transmission mechanism into the assembled state or the disassembled state. The output member can output the power to a load through the output gear.

In some embodiments, the holding portion can be formed on the holding member.

In some embodiments, the engaging portion can comprise a plurality of protruding blocks, a slot being formed between two adjacent protruding blocks. The holding portion can comprise a plurality of protrusions corresponding to the slots. The protrusions can engage into or disengage from the corresponding slots to cause the engaging portion abut against the holding portion or release from the holding portion.

In some embodiments, the worm wheel shaft can comprise a transmission shaft. The engaging portion can be provided at an end portion of the transmission shaft. The plurality of protruding blocks can be arranged along a circumference of an end face of the transmission shaft with an interval therebetween.

In some embodiments, two engaging portions can be respectively provided at two ends of the transmission shaft.

In some embodiments, the locking member can pass through the output gear and the holding member and be threadedly connected to or disconnected from the worm wheel shaft to abut the holding member against the worm wheel shaft to or release the holding member from the worm wheel.

In some embodiments, the locking member can comprise a connecting rod, the connecting rod being threadedly connected to or disconnected from the transmission shaft to cause the holding member abut against the worm wheel shaft or release from the worm wheel shaft.

In some embodiments, the transmission shaft can be provided with an accommodating hole. A collar can extend from a position at a middle of an inner wall of the accommodating hole, and the worm wheel shaft can be threadedly connected to or disconnected from the connecting rod through the collar.

In some embodiments, a thread can be formed on a surface of the collar facing a central axis of the transmission shaft.

In some embodiments, the holding member can be provided with a via hole, and the output gear can be provided with a through hole and a groove in communication with the through hole. The holding member can be mounted within the groove. The locking member can protrude from the holding member upon passing through the through hole and the via hole.

In some embodiments, the plurality of protrusions can be arranged along a circumference of the via hole with an interval therebetween.

In some embodiments, the holding member can be provided with a guide hole. A rib can be fixed on a bottom surface of the groove facing the holding member. The rib can be inserted into the guide hole to guide a connection between the output gear and the holding member.

In some embodiments, the output gear can comprise a meshing portion through which the output gear can drive a rotation of the load.

Another aspect of the present disclosure provides a follow focus actuator, the follow focus actuator comprising a casing, a power device and a transmission mechanism connected to the casing for transmitting a power of the power device, the transmission mechanism comprising an output member and a worm wheel shaft connected to the power device to transmit the power of the power device to the output member. The output member can output the power. The worm wheel shaft can drive a coaxial rotation of the output member by a rotation of the worm wheel shaft to output the power. The worm wheel shaft and the output member can be engaged with each other through a relative movement along an axial direction. The engagement can limit a relative rotation between the worm wheel shaft and the output member.

In some embodiments, the transmission mechanism can further comprise a locking member rotatably provided on the output member. The locking member can pass through the output member along an axial direction of the output member. An operating portion provided on the locking member can be operated to connect the locking member with the worm wheel shaft or disconnect locking member from the worm wheel shaft. The relative movement between the worm wheel shaft and the output member can be limited when the locking member is connected with the worm wheel shaft.

In some embodiments, the power device can be provided within the casing. The transmission mechanism can be provided on the casing through the worm wheel shaft. The transmission mechanism can be connected to the power device through the worm wheel shaft. The power device can drive a rotation of the output member through the worm wheel shaft.

In some embodiments, a clearing slot can be provided on the casing for accommodating the output member upon assembling the follow focus actuator.

In some embodiments, two clearing slots can be provided facing away from each other.

In some embodiments, the casing can be provided with a housing hole in communication with the clearing slot. The worm wheel shaft can be mounted within the housing hole.

In some embodiments, a receiving cavity in communication with the housing hole can be formed in the casing. The power device can be received in the receiving cavity.

In some embodiments, the power device can comprise an output shaft meshed with the worm wheel shaft to drive the rotation of the worm wheel shaft.

In some embodiments, the follow focus actuator can further comprise a latching member connected to the casing. The follow focus actuator can be detachably connected to a carrier through the latching member.

In some embodiments, the latching member can comprise a knob movably connected to the casing, a stationary portion connected to the casing and a movable portion rotatably connected to the stationary portion. The knob can be rotatable relative to the casing to bring the latching member into a locked state or a disassembled state.

In some embodiments, the movable portion can be connected to the knob. The knob can drive a rotation of the movable portion relative to the stationary portion.

In some embodiments, a receiving hole for receiving the carrier can be formed by the movable portion and the stationary portion when the latching member is in the locked state.

In some embodiments, the worm wheel shaft can comprise an engaging portion, and the output member can comprise a holding portion. The engaging portion can abut against the holding portion or release from clearing slot to bring the transmission mechanism into an assembled state or a disassembled state.

In some embodiments, the output member can comprise a holding member and an output gear connected to the holding member. The holding member can abut against the worm wheel shaft or release from the worm wheel shaft to bring the transmission mechanism into the assembled state or the disassembled state. The output member can output the power to a load through the output gear.

In some embodiments, the holding portion can be formed on the holding member.

In some embodiments, the engaging portion can comprise a plurality of protruding blocks, a slot being formed between two adjacent protruding blocks. The holding portion can comprise a plurality of protrusions corresponding to the slots. The protrusions can engage into or disengage from the corresponding slots to cause the engaging portion abut against the holding portion or release from the holding portion.

In some embodiments, the worm wheel shaft can comprise a transmission shaft. The engaging portion can be provided at an end portion of the transmission shaft. The plurality of protruding blocks cam be arranged along a circumference of an end face of the transmission shaft with an interval therebetween.

In some embodiments, two engaging portions can be respectively provided at two ends of the transmission shaft.

In some embodiments, the locking member can pass through the output gear and the holding member and be threadedly connected to or disconnected from the worm wheel shaft to abut the holding member against the worm wheel shaft to or release the holding member from the worm wheel.

In some embodiments, the locking member can comprise a connecting rod, the connecting rod being threadedly connected to or disconnected from the transmission shaft to cause the holding member abut against the worm wheel shaft or release from the worm wheel shaft.

In some embodiments, the transmission shaft can be provided with an accommodating hole. A collar can extend from a position at a middle of an inner wall of the accommodating hole, and the worm wheel shaft can be threadedly connected to or disconnected from the connecting rod through the collar.

In some embodiments, a thread can be formed on a surface of the collar facing a central axis of the transmission shaft.

In some embodiments, the holding member can be provided with a via hole, and the output gear can be provided with a through hole and a groove in communication with the through hole. The holding member can be mounted within the groove. The locking member can protrude from the holding member upon passing through the through hole and the via hole.

In some embodiments, the plurality of protrusions can be arranged along a circumference of the via hole with an interval therebetween.

In some embodiments, the holding member can be provided with a guide hole. A rib can be fixed on a bottom surface of the groove facing the holding member. The rib can be inserted into the guide hole to guide a connection between the output gear and the holding member.

In some embodiments, the output gear can comprise a meshing portion through which the output gear can drive a rotation of the load.

In some embodiments, two output members can be provided each of which being detachably connected to the worm wheel shaft through the locking member. The worm wheel shaft can drive a coaxial rotation of the two output members.

Another aspect of the present disclosure provides an imaging device, the imaging device comprising a gimbal, an imaging element provided on the gimbal and a follow focus actuator provided on the gimbal, the follow focus actuator comprising a casing and a power device, and further comprising a transmission mechanism connected to the casing for transmitting a power of the power device, the transmission mechanism comprising an output member and a worm wheel shaft connected to the power device to transmit the power of the power device to the output member. The output member can output the power to the imaging element. The worm wheel shaft can drive a coaxial rotation of the output member by a rotation of the worm wheel shaft to output the power. The worm wheel shaft and the output member can be engaged with each other through a relative movement along an axial direction. The engagement can limit a relative rotation between the worm wheel shaft and the output member.

In some embodiments, the transmission mechanism can further comprise a locking member rotatably provided on the output member. The locking member can pass through the output member along an axial direction of the output member. An operating portion provided on the locking member can be operated to connect the locking member with the worm wheel shaft or disconnect locking member from the worm wheel shaft. The relative movement between the worm wheel shaft and the output member can be limited when the locking member is connected with the worm wheel shaft.

In some embodiments, the gimbal can comprise a carrier, a carrying platform and a mounting rod provided on the carrier, a first operating handle and a second operating handle connected to the mounting rod, and a carrying rod connected to the carrying platform. The imaging element can be provided on the carrying platform. The follow focus actuator can be connected to the carrying rod.

In some embodiments, the follow focus actuator can comprise a gear ring. The gear ring can be sleeved on a lens ring of the imaging element. The gear ring can be meshed with the output member. The power device can drive a rotation of the gear ring through the adaptor to effect a focusing of the imaging element. Or, the gear ring can be sleeved on an aperture ring of the imaging element and meshed with the output member, and the power device can drive a rotation of the gear ring through the adaptor to effect an aperture adjustment of the imaging element.

In some embodiments, the power device can be provided within the casing. The transmission mechanism can be provided on the casing through the worm wheel shaft. The transmission mechanism can be connected to the power device through the worm wheel shaft. The power device can drive a rotation of the output member through the worm wheel shaft.

In some embodiments, a clearing slot can be provided on the casing for accommodating the output member upon assembling the follow focus actuator.

In some embodiments, two clearing slots can be provided facing away from each other.

In some embodiments, the casing can be provided with a housing hole in communication with the clearing slot. The worm wheel shaft can be mounted within the housing hole.

In some embodiments, a receiving cavity in communication with the housing hole can be formed in the casing. The power device can be received in the receiving cavity.

In some embodiments, the power device can comprise an output shaft meshed with the worm wheel shaft to drive the rotation of the worm wheel shaft.

In some embodiments, the follow focus actuator can further comprise a latching member connected to the casing. The follow focus actuator can be detachably connected to the gimbal through the latching member.

In some embodiments, the latching member can comprise a knob movably connected to the casing, a stationary portion connected to the casing and a movable portion rotatably connected to the stationary portion. The knob can be rotatable relative to the casing to bring the latching member into a locked state or a disassembled state.

In some embodiments, the movable portion can be connected to the knob, and the knob can drive a rotation of the movable portion relative to the stationary portion.

In some embodiments, a receiving hole for receiving the carrier can be formed by the movable portion and the stationary portion when the latching member is in the locked state.

In some embodiments, the worm wheel shaft can comprise an engaging portion, and the output member can comprise a holding portion. The engaging portion can abut against the holding portion or release from the holding portion to bring the transmission mechanism into an assembled state or a disassembled state.

In some embodiments, the output member can comprise a holding member and an output gear connected to the holding member. The holding member can abut against the worm wheel shaft or release from the worm wheel shaft to bring the transmission mechanism into the assembled state or the disassembled state. The output member can output the power to the imaging element through the output gear.

In some embodiments, the holding portion can be formed on the holding member.

In some embodiments, the engaging portion can comprise a plurality of protruding blocks, a slot being formed between two adjacent protruding blocks. The holding portion can comprise a plurality of protrusions corresponding to the slots. The protrusions can engage into or disengage from the corresponding slots to cause the engaging portion abut against the holding portion or release from the holding portion.

In some embodiments, the worm wheel shaft can comprise a transmission shaft. The engaging portion can be provided at an end portion of the transmission shaft. The plurality of protruding blocks can be arranged along a circumference of an end face of the transmission shaft with an interval therebetween.

In some embodiments, two engaging portions can be respectively provided at two ends of the transmission shaft.

In some embodiments, the locking member can pass through the output gear and the holding member and be threadedly connected to or disconnected from the worm wheel shaft to abut the holding member against the worm wheel shaft to or release the holding member from the worm wheel.

In some embodiments, the locking member can comprise a connecting rod, the connecting rod being threadedly connected to or disconnected from the transmission shaft to cause the holding member abut against the worm wheel shaft or release from the worm wheel shaft.

In some embodiments, the transmission shaft can be provided with an accommodating hole. A collar can extend from a position at a middle of an inner wall of the accommodating hole, and the worm wheel shaft can be threadedly connected to or disconnected from the connecting rod through the collar.

In some embodiments, a thread can be formed on a surface of the collar facing a central axis of the transmission shaft.

In some embodiments, the holding member can be provided with a via hole, and the output gear can be provided with a through hole and a groove in communication with the through hole. The holding member can be mounted within the groove. The locking member can protrude from the holding member upon passing through the through hole and the via hole.

In some embodiments, the plurality of protrusions can be arranged along a circumference of the via hole with an interval therebetween.

In some embodiments, the holding member can be provided with a guide hole. A rib can be fixed on a bottom surface of the groove facing the holding member. The rib can be inserted into the guide hole to guide a connection between the output gear and the holding member.

In some embodiments, the output gear can comprise a meshing portion through which the output gear can drive a rotation of the imaging element.

In some embodiments, two output members can be provided each of which being detachably connected to the worm wheel shaft through the locking member. The worm wheel shaft can drive a coaxial rotation of the two output members.

In some embodiments, the gimbal can further comprise a control assembly through which the imaging element can be provided on the gimbal.

In some embodiments, the control assembly can comprise a measuring part and a controller, the measuring part being configured to obtain a status information of the imaging element, the controller being configured to calculate an attitude information of the imaging element based upon the status information and output one or more motor signals based upon the attitude information. The gimbal can further comprise a motor assembly configured to directly drive the gimbal based upon the one or more motor signals to effect a rotation of the imaging element about at least one of a pitch axis, a roll axis or a yaw axis of the gimbal.

In some embodiments, the measuring part can comprise an inertial measurement unit (IMU).

With the transmission mechanism, the follow focus, the follow focus actuator and the imaging device of the disclosure, the adaptor and the output member can be engaged with each other through a relative movement in an axial direction. The engagement can limit a relative rotation between the adaptor and the output member. The transmission mechanism can comprise a locking member rotatably provided on the output member. The locking member can pass through the output member along an axial direction of the output member. An operating portion provided on the locking member can be operated to connect the locking member to or disconnect the locking member from the adaptor, thereby a convenient attachment and/or detachment of the transmission mechanism is effected.

LIST OF REFERENCE NUMERALS

TABLE 1

Figure 1:
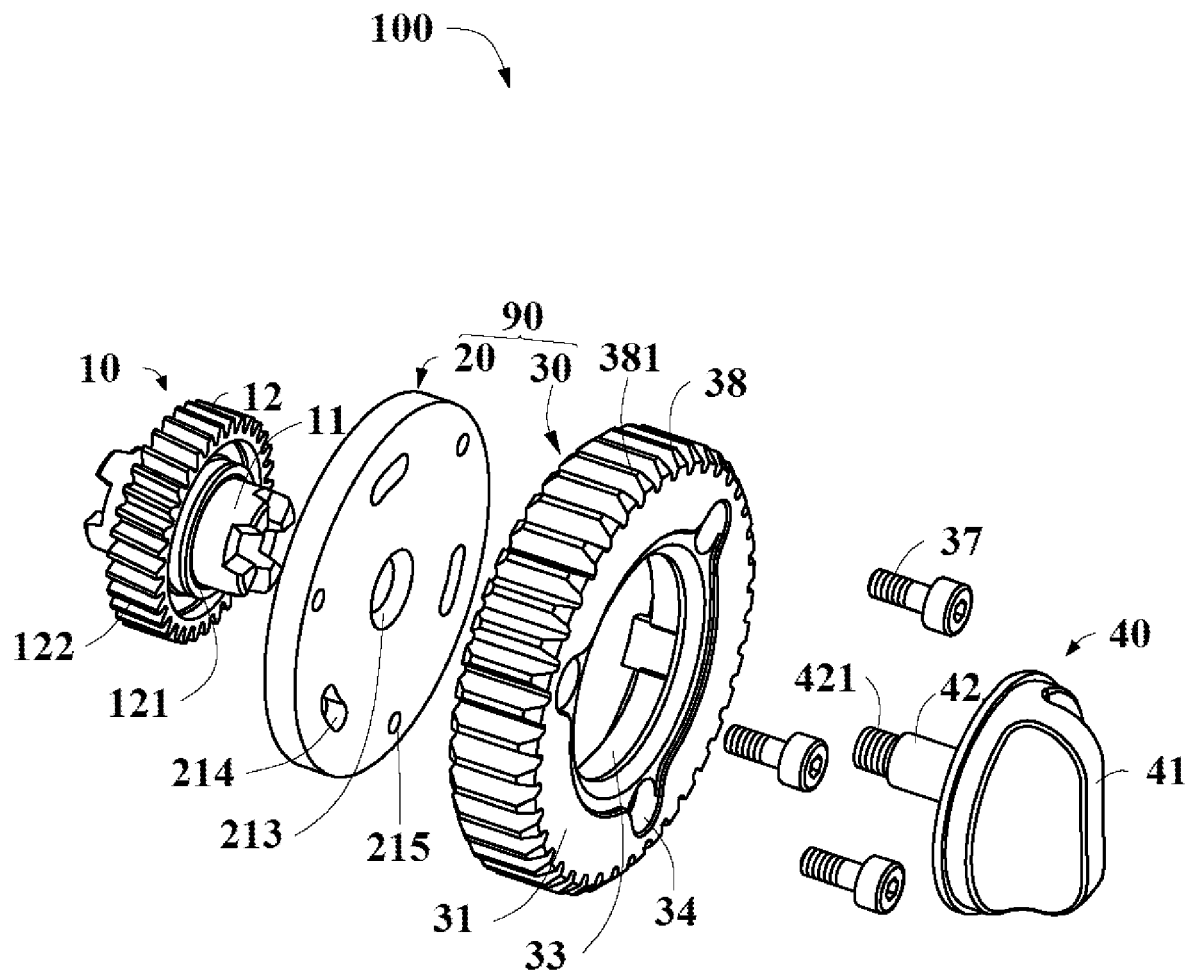
FIG. 1 shows an exploded view of a transmission mechanism in accordance with embodiments of the disclosure.
Figure 2:
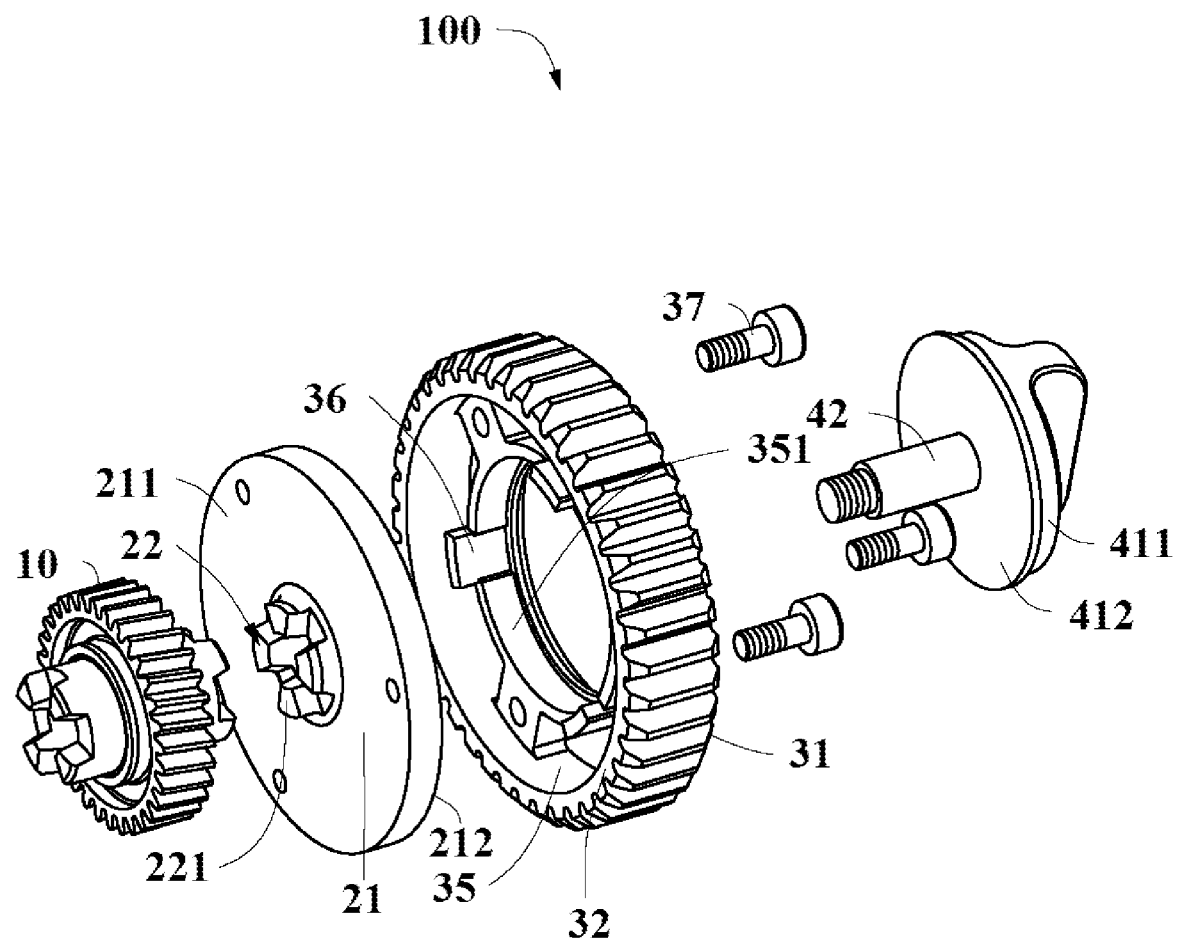
FIG. 2 shows an exploded view of the transmission mechanism of FIG. 1 from another point of view.
Figure 3:
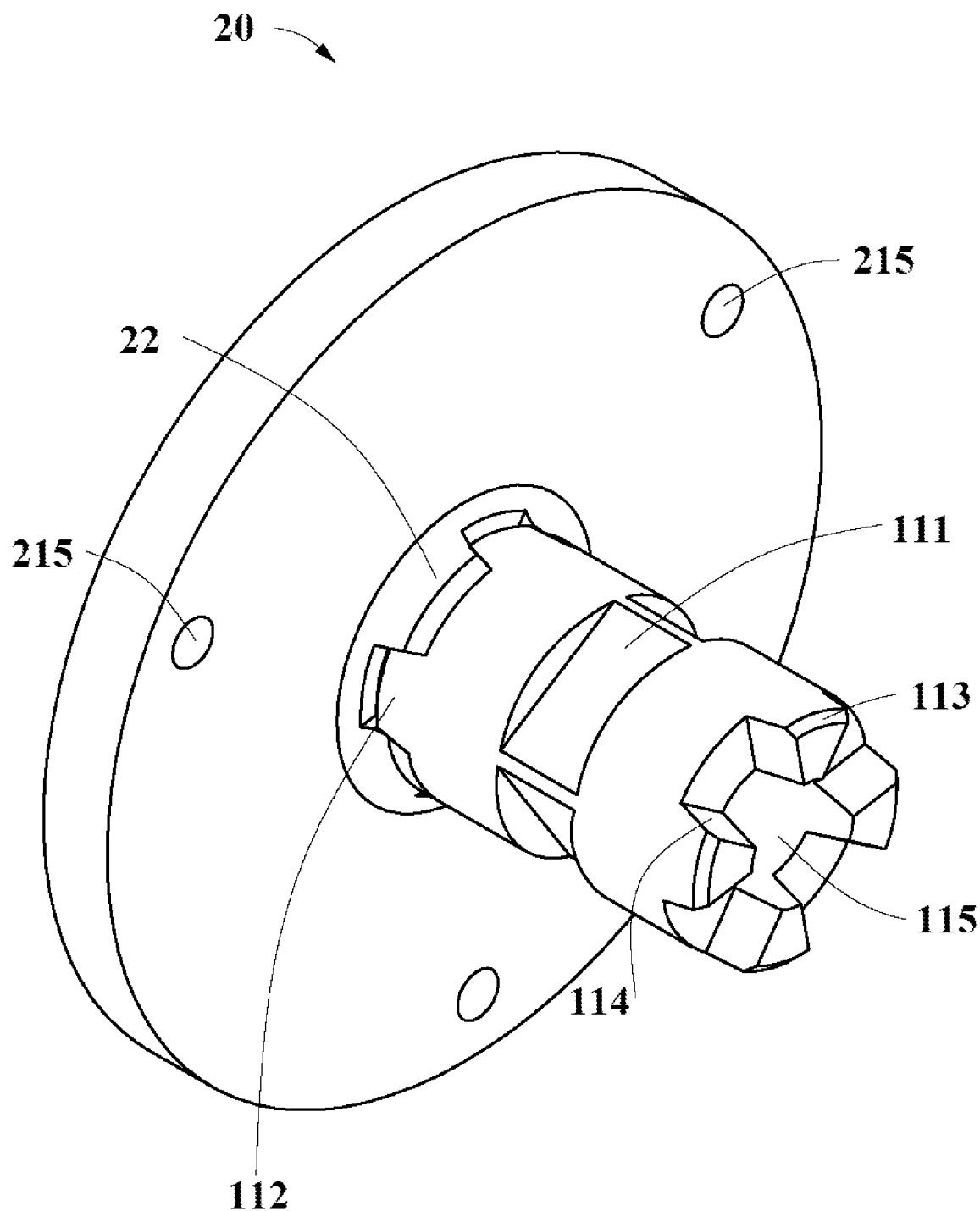
FIG. 3 shows a holding member and a transmission shaft of the transmission mechanism of FIG. 1.
Figure 4:
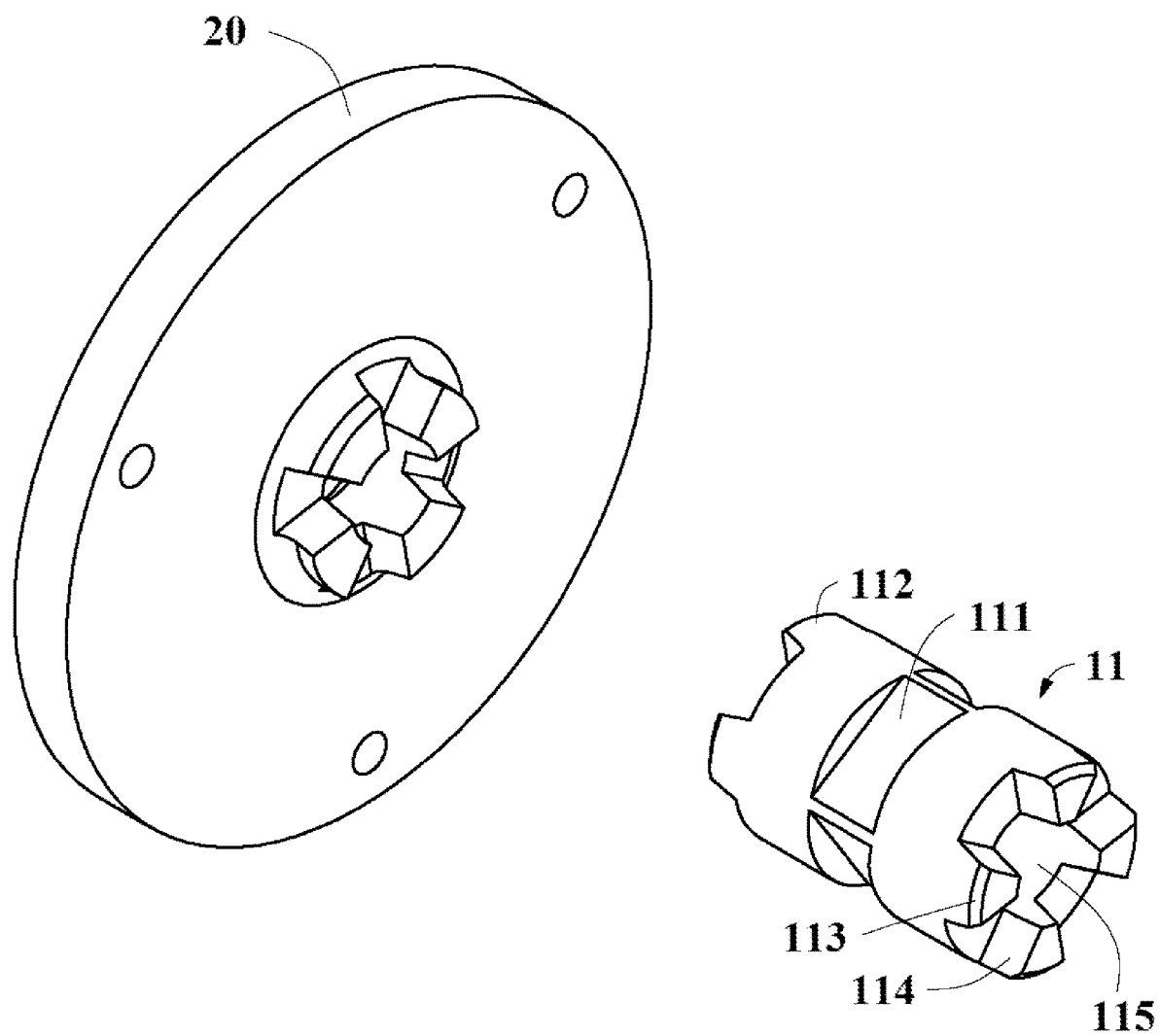
FIG. 4 shows an exploded view of the holding member and the transmission shaft of the transmission mechanism of FIG. 3.
Figure 5:
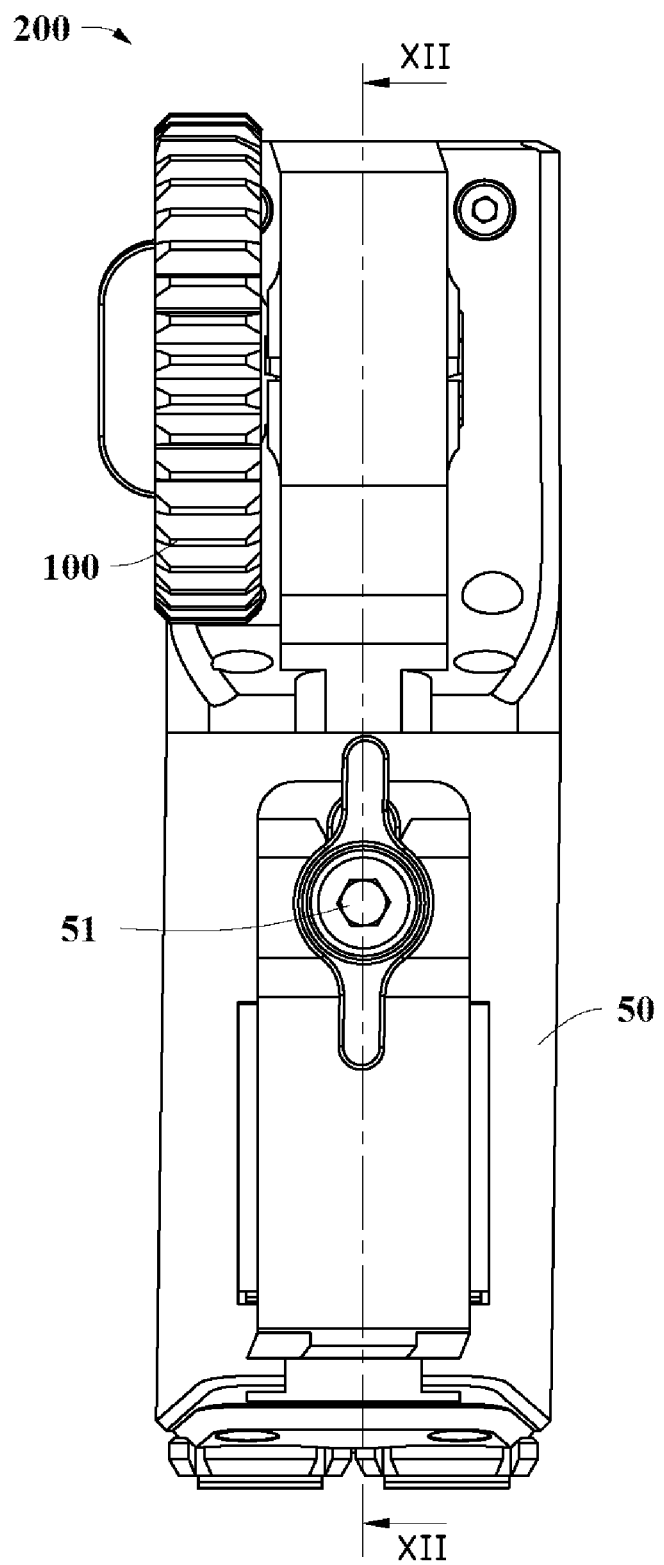
FIG. 5 shows a follow focus having the transmission mechanism of FIG. 1 in accordance with a first embodiment of the disclosure.
Figure 6:
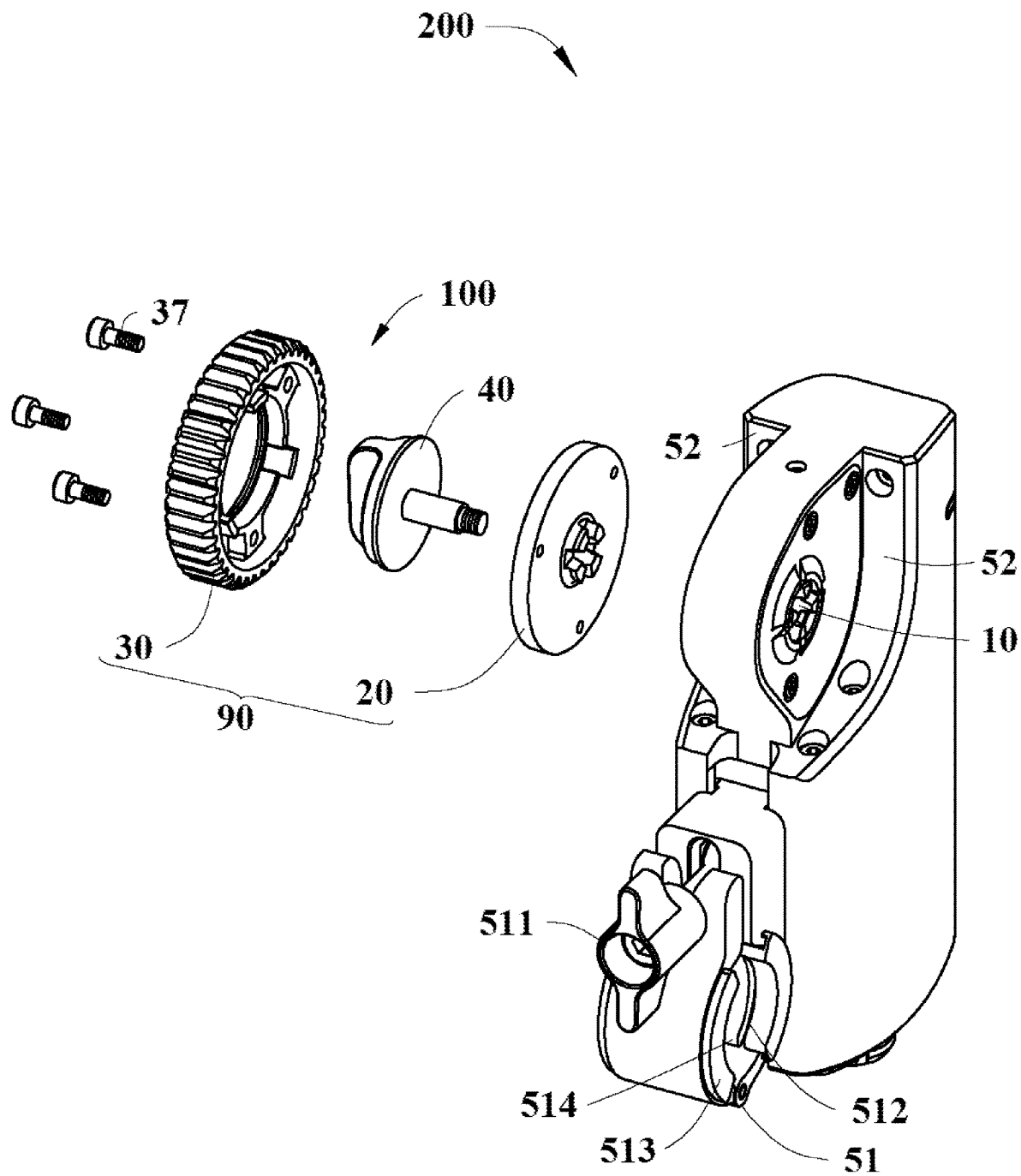
FIG. 6 shows an exploded view of the follow focus of FIG. 5.
Figure 7:
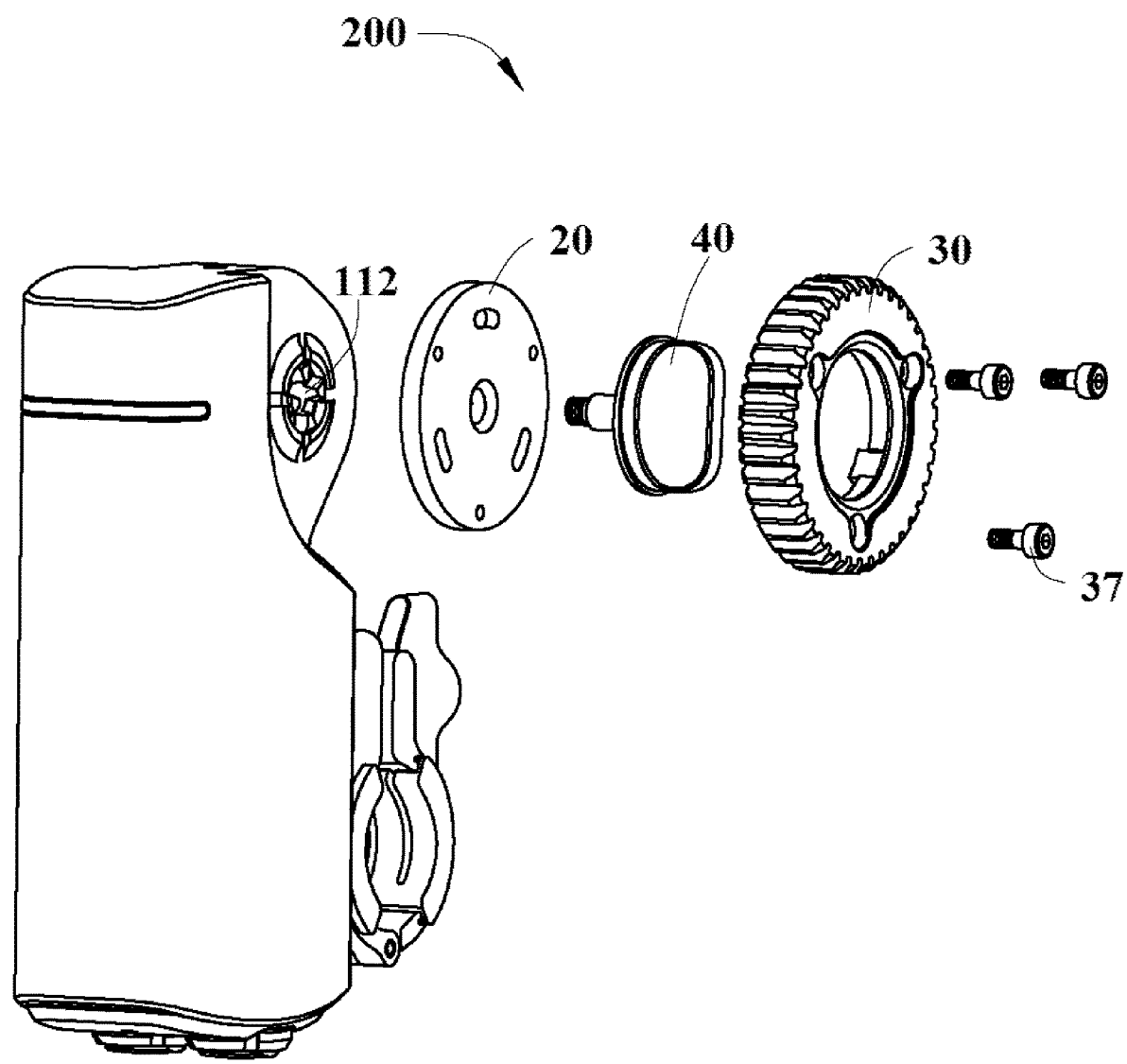
FIG. 7 shows an exploded view of the follow focus of FIG. 5 from another point of view.
Figure 8:
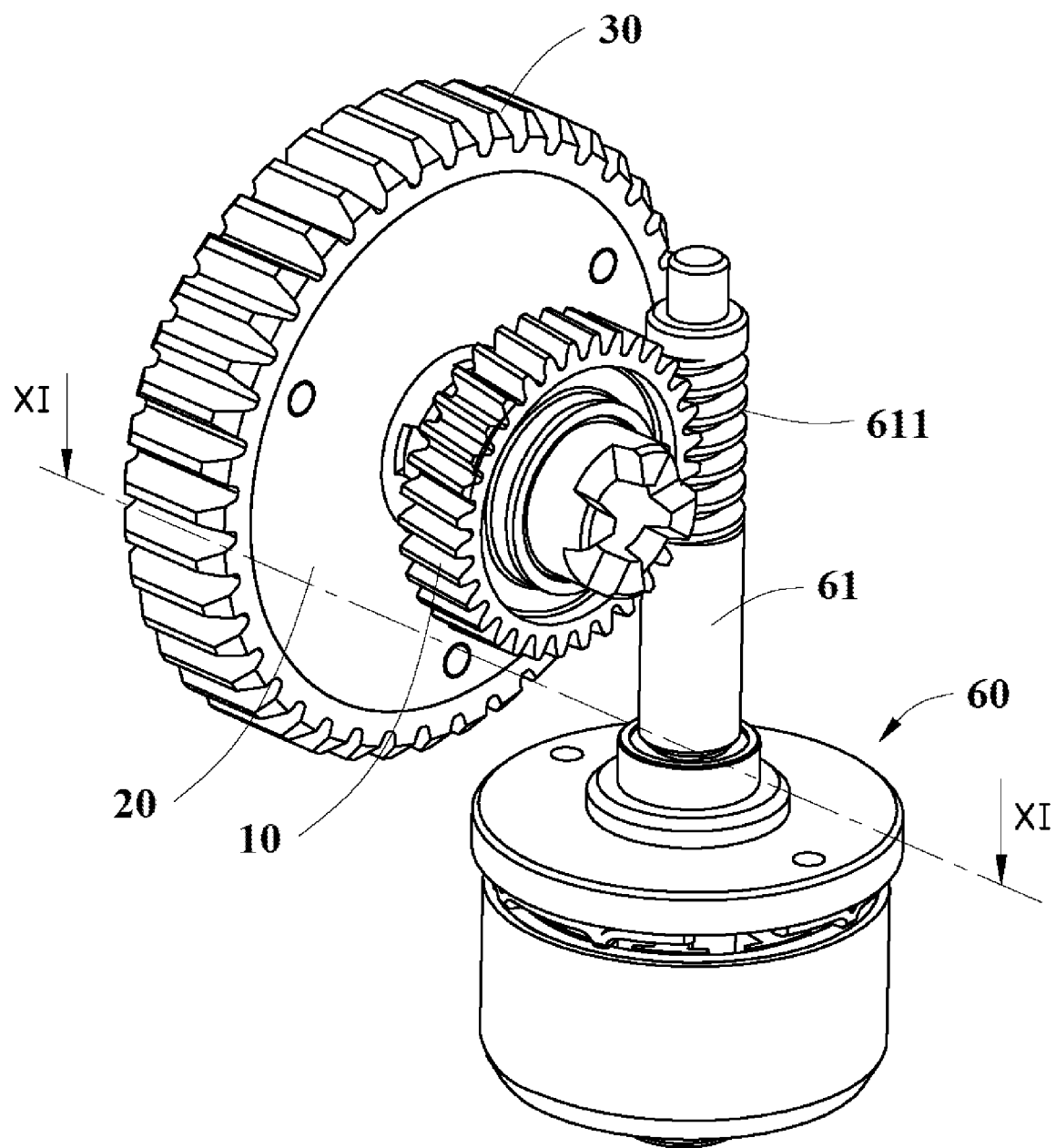
FIG. 8 shows the transmission mechanism and a power device of the follow focus of FIG. 5.
Figure 9:
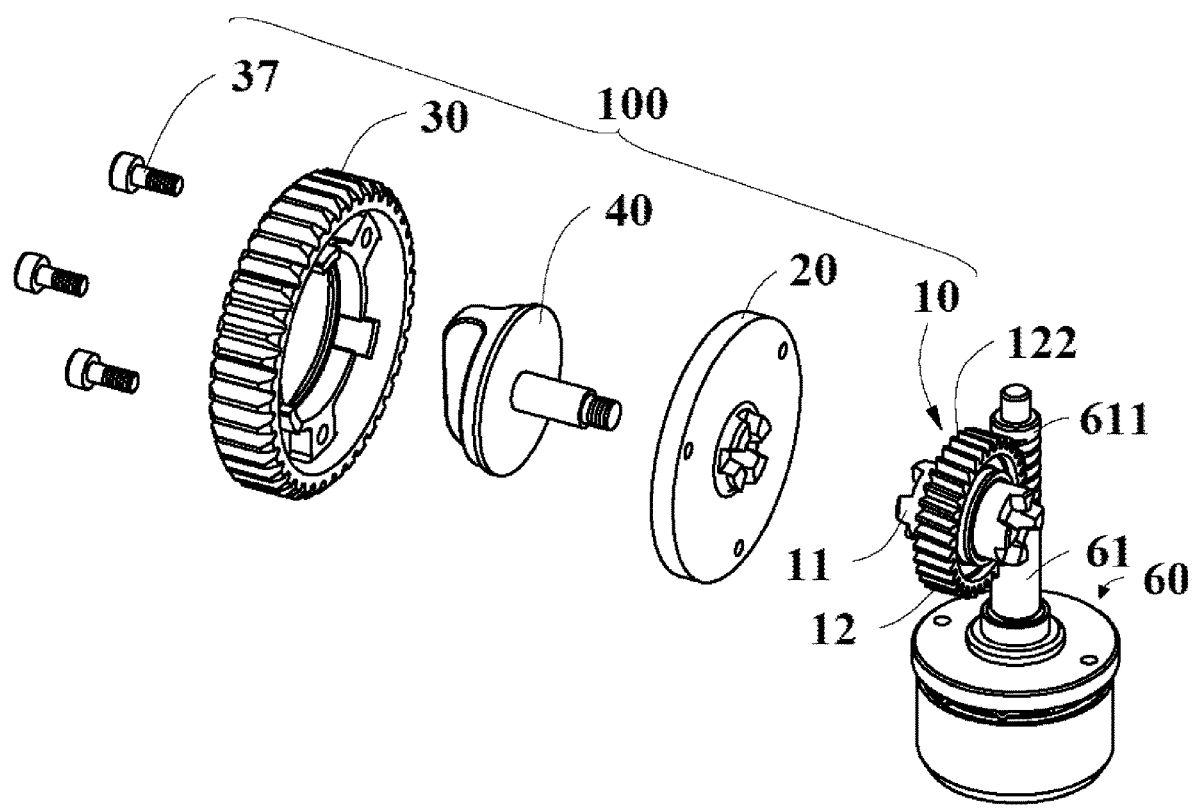
FIG. 9 shows an exploded view of the transmission mechanism and the power device of FIG. 8.
Figure 10:
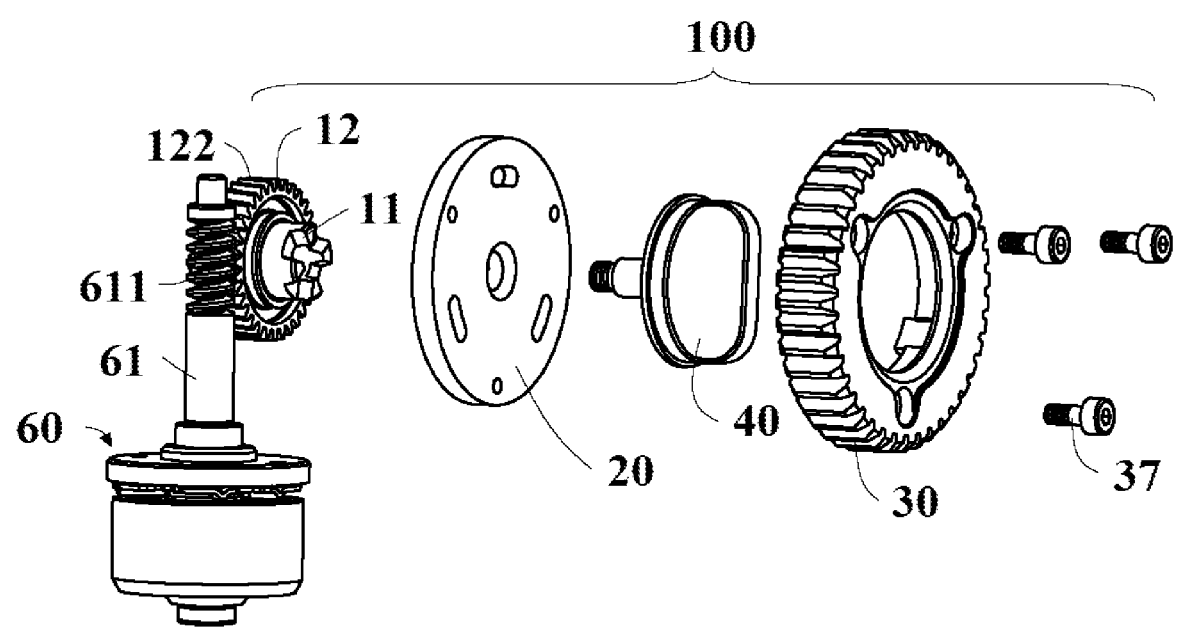
FIG. 10 shows an exploded view of the transmission mechanism and the power device of FIG. 8 from another point of view.

| | |
|---|---|
| Transmission mechanism | 100 |
| Adaptor | 10 |
| Transmission shaft | 11 |
| Mounting portion | 111 |
| Engaging portion | 112 |
| Protruding block | 113 |
| Slot | 114 |
| Accommodating hole | 115 |
| Collar | 116 |
| Transmission wheel | 12 |
| Shaft hole | 121 |
| Gear tooth | 122 |
| Holding member | 20 |
| Body | 21 |
| First surface | 211 |
| Second surface | 212 |

TABLE 1-continued

| | |
|---|---|
| Via hole | 213 |
| Guide hole | 214 |
| Screw hole | 215 |
| Holding portion | 22 |
| Protrusion | 221 |
| Output gear | 30 |
| First end face | 31 |
| Second end face | 32 |
| Through hole | 33 |
| Stepped hole | 34 |
| Groove | 35 |
| Receiving slot | 351 |
| Guide strip | 36 |
| Connector | 37 |
| Meshing portion | 38 |
| Rib | 381 |
| Locking member | 40 |
| Operating portion | 41 |
| Step portion | 411 |
| Fixing surface | 412 |
| Connecting rod | 42 |
| External thread | 421 |
| Follow focus | 200, 300 |
| Casing | 50 |
| Latching member | 51 |
| Knob | 511 |
| Stationary portion | 512 |
| Movable portion | 513 |
| Receiving hole | 514 |
| Clearing slot | 52 |
| Housing hole | 521 |
| Receiving cavity | 53 |
| Power device | 60 |
| Output shaft | 61 |
| Screw tooth | 611 |
| Imaging device | 400 |
| Gimbal | 70 |
| Carrier | 71 |
| Carrying platform | 72 |
| Mounting rod | 73 |
| First operating handle | 74 |
| Second operating handle | 75 |
| Carrying rod | 76 |
| Imaging element | 80 |
| Gear ring | 81 |
| Output member | 90 |

Illustrative embodiments of the disclosure will be described with reference to the drawings.

DETAILED DESCRIPTION OF THE DISCLOSURE

Illustrative embodiments of the disclosure are described with reference to the drawings. The embodiments and features can be combined with one another provided that they are technically compatible.

Referring to FIGS. 1-4, a transmission mechanism 100 in accordance with embodiments of the disclosure can comprise an adaptor 10, an output member 90 and a locking member 40. The adaptor 10 can be detachably connected to the output member 90.

The adaptor 10 can be connected to a power device and transmit a power from the power device to the output member, such that the output member 90 can output the power. The adaptor 10 can drive a coaxial rotation of the output member 90 to allow the output member 90 to output the power. The adaptor 10 and the output member 90 can be engaged to or disengaged from each other by a relative movement along an axial direction, such that the transmission mechanism 100 can be brought into an assembled state or a disassembled state. The engagement can limit a relative rotation between the adaptor 10 and the output member 90. The locking member 40 can be rotatably provided on the output member 90. The locking member 40 can pass through the output member 90 along an axial direction of the output member 90, and be detachably connected to the adaptor 10. A relative movement between the adaptor 10 and the output member 90 along an axial direction can be limited once the locking member 40 is connected with the adaptor 10.

The output member 90 can comprise a holding member 20 and an output gear 30. The locking member 40 can be movably connected to the output gear 30 and the holding member 20. The locking member 40 can be rotated relative to the output member 90 and be connected to or disconnected from the adaptor 10 during the rotation, such that the holding member 20 and the adaptor 10 can be engaged or disengaged, thereby the transmission mechanism 100 is attached or detached.

The adaptor 10 can be connected to the power device. The adaptor 10 can be engaged to or disengaged from the output member 90 by connecting to or disconnecting from the locking member 40 thereby bringing the transmission mechanism 100 into the assembled state or the disassembled state. The adaptor 10 can comprise a transmission shaft 11 and a transmission wheel 12. The transmission shaft 11 can be coupled to the transmission wheel 12 and rotate coaxially with the transmission wheel 12. The power device can drive a rotation of the transmission shaft 11 by the transmission wheel 12.

A mounting portion 111 can be formed on the transmission shaft 11. The mounting portion 111 can prevent a movement of the transmission wheel 12 relative to the transmission shaft 11 along a circumferential direction and an axial direction of the transmission shaft 11. In some embodiments, the mounting portion 111 can be a plane. In some embodiments, the mounting portion 111 can comprise four mounting portions 111 which are equally arranged along the circumferential direction of the transmission shaft 111. It will be appreciated that, the number of the mounting portions 111 is not limited to that described in the illustrative embodiments. For instance, the number of the mounting portions can be more than four or less than four. An engaging portion 112 can be formed at each end of the transmission shaft 11. The engaging portion 112 can abut against or release from the holding member 20 to bring the transmission mechanism 100 into the assembled state or the disassembled state. In some embodiments, the engaging portion 112 can comprise a plurality of protruding blocks 113 provided on an end face of the transmission shaft 11. In some embodiments, the plurality of protruding blocks 113 can be arranged along a circumference of the end face of the transmission shaft 11 with an interval therebetween. A slot 114 can be formed between two adjacent protruding blocks 113. The slot 114 can be meshed with the holding member 20 to engage the adaptor 10 with the holding member 20.

Figure 11:
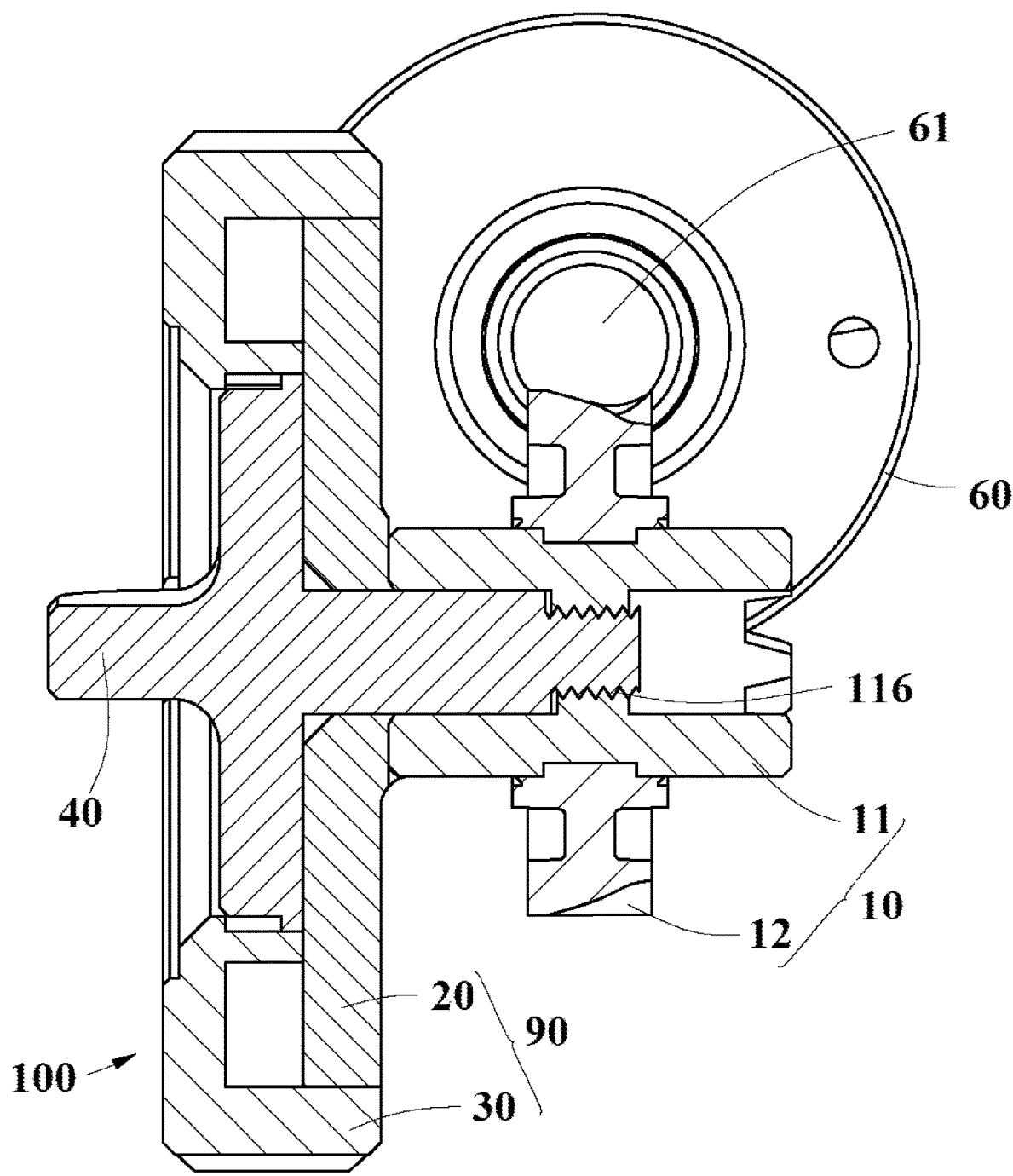
FIG. 11 shows a cross-sectional view of the transmission mechanism and the power device of FIG. 8 along an XI-XI line.
Figure 12:
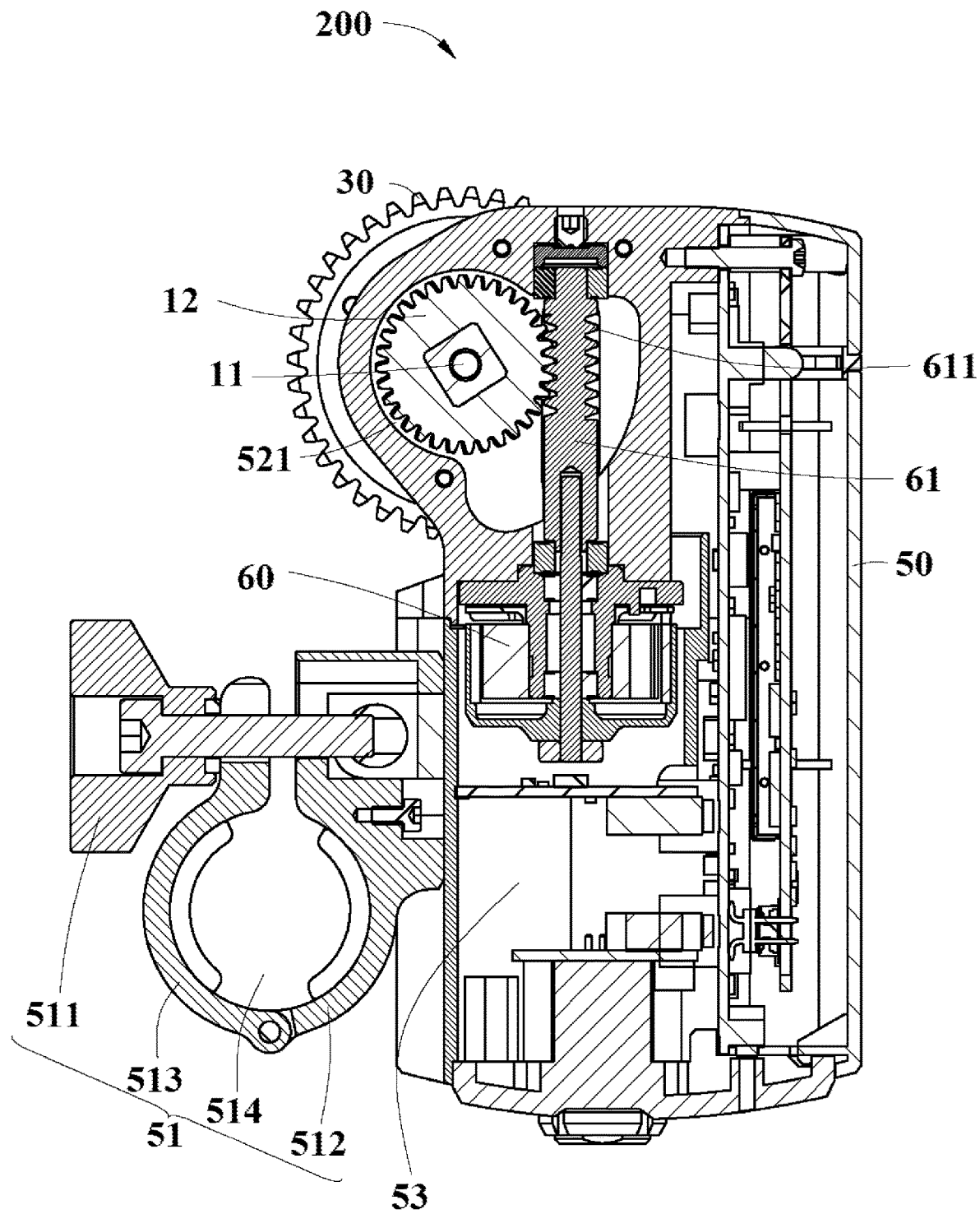
FIG. 12 shows a cross-sectional view of the follow focus of FIG. 5 along an XII-XII line.

The transmission shaft 11 can be provided with an accommodating hole 115. A central axis of the accommodating hole 115 can substantially coincide with a central axis of the transmission shaft 11. A collar 116 can extend from a position at a middle of an inner wall of the accommodating hole 115 (refer to FIG. 11). The collar 116 can extend along a circumferential direction of the accommodating hole 115. The transmission shaft 11 can be connected to the locking member 40 through the collar 116. A thread can be formed on a surface of the collar 116 facing a central axis thereof. The thread can be meshed with the locking member 40 to connect or disconnect the transmission shaft 11 with the locking member 40. It will be appreciated that, the collar 116 can be omitted in alternative embodiments. For instance, a thread can be formed on the inner wall of the accommodating hole 115, and the thread on the inner wall of the accommodating hole 115 can be meshed with the locking member 40, such that the transmission shaft 11 and the locking member 40 can be connected to or disconnected from each other.

The transmission wheel 12 can be sleeved on the transmission shaft 11. The transmission wheel 12 can be meshed with the power device to drive a rotation of the transmission shaft 11. In some instances, the transmission wheel 12 can be meshed with the mounting portion 111 of the transmission shaft 11, such that a movement of the transmission wheel 12 relative to the transmission shaft 11 along the circumferential direction and the axial direction of the transmission shaft 11 can be limited by the mounting portion 111. The transmission wheel 12 can be provided with a shaft hole 121, within which the transmission shaft 11 can be partially received. The mounting portion 111 and the shaft hole 121 can be meshed with each other, and the transmission wheel 12 can be provided on the mounting portion 111 through the shaft hole 121. The transmission wheel 12 can comprise a plurality of gear teeth 122, through which the transmission wheel 12 can be meshed with the power device. The transmission wheel 12 can be provided in a substantially disk-like shape. The plurality of gear teeth 122 can be arranged on a circumference of the transmission wheel 12 with an interval therebetween. An angle between a lengthwise direction of each one of the gear teeth 122 and an axial direction of a central axis of the transmission wheel 12 can be an acute angle. In some embodiments, the adaptor 10 can be a worm wheel shaft, and the transmission wheel 12 can be a worm wheel.

The holding member 20 can be detachably connected to the adaptor 10. The holding member 20 can comprise a body 21 and a holding portion 22 provided on the body 21. The holding portion 22 can abut against or release from the engaging portion 112 to cause the holding member 20 and the adaptor 10 to abut against or release from each other. The body 21 can comprise a first surface 211 and a second surface 212 facing away from each other. The holding portion 22 can be provided on the first surface 211. The body 21 can be provided with a via hole 213 through which the locking member 40 passes. The via hole 213 can penetrate through the first surface 211 and the second surface 212.

The body 21 can be provided with a guide hole 214 and a screw hole 215. The guide hole 214 can be an arc-shaped hole for guiding a connection between the holding member 20 and the output gear 30. The holding member 20 can be connected to the output gear 30 through the screw hole 215. In some embodiments, three guide holes 214 and three screw holes 215 can be provided. The three guide holes 214 and the three screw holes 215 can be spaced apart from each other and equally arranged along a circle having a center coinciding on a central axis of the via hole 213. It will be appreciated that, in other embodiments, the number of the guide holes 214 or the screw holes 215 can vary according to actual requirements.

The holding portion 22 can comprise a plurality of protrusions 221 meshed with the slots 114. The protrusions 221 can be engaged into or disengaged from the slots 114 to cause the holding member 20 and the adaptor 10 to abut against or release from each other. A shape and a position of the plurality of protrusions 221 can correspond to a shape and a position of the plurality of slots 114. In some embodiments, the plurality of protrusions 221 can be arranged along a circumference of the via hole 213 with an interval therebetween.

The output gear 30 can be connected to the holding member 20 and the locking member 40 to drive a rotation of a load, such as a lens ring of an imaging device. The output gear 30 can comprise a first end face 31 and a second end face 32 facing away from each other. The first end face 31 can be proximal to the locking member 40 while the second end face 32 can be distal to the locking member 40. The output gear 30 can be provided with a through hole 33, within which the locking member 40 can be partially received. The output gear 30 can be provided with a stepped hole 34, through which the output gear 30 can be connected to the holding member 20. In some embodiments, three stepped hole 34 can be provided. Positions of the three stepped holes 34 can correspond to positions of the three screw holes 215. Three connectors 37 can be respectively received within the three stepped holes 34 and the three screw holes 215, such that the output gear 30 is connected with the holding member 20. In some embodiments, the connectors 37 can be screws. It will be appreciated that, in other embodiments, the connectors 37 can be provided as other parts such as bolts or pins. The output gear 30 and the holding member 20 can be connected to each other by other means.

The output gear 30 can be provided with a groove 35. The groove 35 can penetrate through the second end face 32 and be in communication with the stepped holes 34 and the through hole 33 to receive the holding member 20. A bottom surface of the groove 35 facing the holding member 20 can be provided with a receiving slot 351 which is in communication with the through hole 33. A size of the receiving slot 351 in a direction perpendicular to an axial direction of the output gear 30 can be greater than a size of the through hole 33 in a direction perpendicular to the axial direction of the output gear 30. A guide strip 36 can be fixed on the bottom surface of the groove 35 facing the holding member 20. The guide strip 36 can be inserted into the guide hole 214 to provide a guidance in connecting the output gear 30 with the holding member 20. A shape of the guide strip 36 can correspond to a shape of the guide hole 214. In some embodiments, three guide strips 36 can be provided. Positions of the three guide strips 36 can correspond to positions of the three guide holes 214. The three guide strips 36 can be equally arranged along a circumference of the receiving slot 351. It will be appreciated that, in other embodiments, the number of the guide strips 36 can vary according to actual requirements.

The output gear 30 can comprise a meshing portion 38 through which the load can be driven by the output gear 30. In some embodiments, the meshing portion 38 can comprise a plurality of ribs 381. The output gear 30 can be provided in a substantially disk-like shape. The plurality of ribs 381 can be equally arranged along a circumference of the output gear 30. The meshing portion 38 can be meshed with the load to drive the load. In some embodiments, the rib 381 can be a gear teeth.

It will be appreciated that, the holding member 20 can be integrally formed with the output gear 30. Optionally, the holding portion 22 can be directly formed on the output gear 30 without providing a separate holding member 20.

The locking member 40 can be movably connected to the output gear 30 and the holding member 20. The locking member 40 can be connected to or disconnected from the adaptor 10 by a rotation relative to the output gear 30 and the holding member 20. The locking member 40 can comprise an operating portion 41 and a connecting rod 42 fixedly connected to the operating portion 41. The connecting rod 42 can be meshed with the collar 116 to connect the locking member 40 to or disconnect the locking member 40 from the adaptor 10. The operating portion 41 can be operated to engage the locking member 40 to the adaptor 10 or disengage the locking member 40 from the adaptor 10.

The operating portion 41 can be provided in a substantially stepped shape. The operating portion 41 can comprise a step portion 411 to be received within the receiving slot 351. The step portion 411 can comprise a fixing surface 412 facing the holding portion 20. The connecting rod 42 can be fixed on the fixing surface 412. In some embodiments, a size of the step portion 411 in a direction perpendicular to the axial direction of the output gear 30 can be greater than the size of the through hole 33 in a direction perpendicular to the axial direction of the output gear 30. An external thread 421 can be provided on the connecting rod 42. The external thread 421 can be threadedly meshed with the thread of the collar 116. The locking member 40 can be connected with the adaptor 10 by a threaded connection between the external thread 421 and the thread of the collar 116.

In assembling the transmission mechanism, the operating portion 41 of the locking member 40 can be inserted into the through hole 33, and the step portion 411 of the operating portion 41 can be received within the receiving slot 351. The three connectors 37 can be respectively received within the three stepped holes 34 and the three screw holes 215, and the three guide strips 36 can be respectively inserted into the three guide holes 214, such that the output gear 30 can be fixedly connected to the holding member 20. The holding member 20 can be received within the groove 35. The connecting rod 42 of the locking member 40 can pass through the via hole 213 and protrude from the holding member 20. The operating portion 41 can be partially received within the through hole 33, with the fixing surface 412 and the holding member 20 facing each other. It will be appreciated that, in other embodiments, the guide strips 36 and the guide holes 214 can be omitted.

The step portion 411 of the operating portion 41 can be received within the receiving slot 351. The step portion 411 can be positioned between the holding member 20 and a bottom surface of the receiving slot 351. The size of the step portion 411 in a direction perpendicular to the axial direction of the output gear 30 can be greater than the size of the through hole 33 in a direction perpendicular to the axial direction of the output gear 30, such that the locking member 40 can be prevented from releasing from the output gear 30. The holding member 20 can be fixedly connected to the output gear 30 and cover the receiving slot 351, such that a release of the locking member 40 from the receiving slot 351 and the groove 35 of the output gear 30 can be prevented by the holding member 20.

The external thread of the connecting rob 42 can be threadedly connected to the thread of the collar 116 by rotating the operating portion 41 along a predetermined direction by a predetermined angle, such that the connecting rod 42 can be partially received in the collar 116. The protrusions 221 of the holding member 20 can be engaged into the slots 114 of the adaptor 10, such that the holding member 20 and the adaptor 10 can abut against each other through the engaging portion 112 and the holding portion 22 to bring the transmission mechanism 100 into the assembled state. The connecting rod 42 can be gradually disengaged from the collar 116 by rotating the operating portion 41 along a direction opposite to the predetermined direction by the predetermined angle, such that the locking member 40 can be disengaged from the adaptor 10. The holding member 20 can be detached from the adaptor 10, and the protrusions 211 can be detached from the slots 114 to bring the transmission mechanism 100 into the disassembled state.

Referring to FIGS. 5-12, a follow focus 200 in accordance with a first embodiment of the disclosure can comprise the transmission mechanism 100, a casing 50 and a power device 60. The transmission mechanism 100 can be connected to the casing 50. The power device 60 can provide power to the transmission mechanism 100, and the transmission mechanism 100 can drive a load. In some embodiments, the power device 60 can be provided within the casing 50, the transmission mechanism 100 can be provided on the casing 50 through the adaptor 10, and the adaptor 10 can be connected to the power device 60. The power device 60 can drive a rotation of the output gear 30 through the adaptor 10.

The casing 50 can be connected to a latching member 51 through which the casing 50 can be detachably connected to a carrier. The latching member 51 can comprise a knob 511, a stationary portion 512 and a movable portion 513. The knob 511 can be movably connected to the casing 50, and can be capable of rotating relative to the casing 50 to bring the latching member 51 into a locked state or a rotatable state. The stationary portion 512 can be rotatably connected to one end of the movable portion 513, and the other end of the movable portion 513 can be connected to the knob 51. The knob 511 can drive a movement of the movable portion 513, such that the movable portion 513 can be rotated relative to the stationary portion 512 to bring the latching member 51 into the locked state or the rotatable state. When the latching member 51 is in the locked state, a receiving hole 514 for partially receiving the carrier can be formed by the movable portion 513 and the stationary portion 512.

A clearing slot 52 can be formed on the casing 50 to accommodate the output member 90 upon assembling the follow focus 200. In some embodiments, two clearing slot 52 can be provided facing away from each other. The casing 50 can be provided with a housing hole 521 in communication with the clearing slots 52. The adaptor 10 can be mounted within the housing hole 521, and the engaging portion 112 can protrude from the housing hole 521. The casing 50 can be provided with a receiving cavity 53 in communication with the housing hole 521. The power device 60 can be received in the receiving cavity 53. The power device 60 can comprise an output shaft 61 which is meshed with transmission wheel 12 of the adaptor 10. The power device 60 can drive the adaptor 10 through the output shaft 61 and the transmission wheel 12. A lengthwise direction of the output shaft 61 can be substantially perpendicular to an axial direction of a central axis of the adaptor 10. Screw teeth 611 can be provided on a circumference of the output shaft 61. The screw teeth 611 can be meshed with the gear teeth 122 of the transmission wheel 12 to drive a rotation of the adaptor 10.

Figure 13:
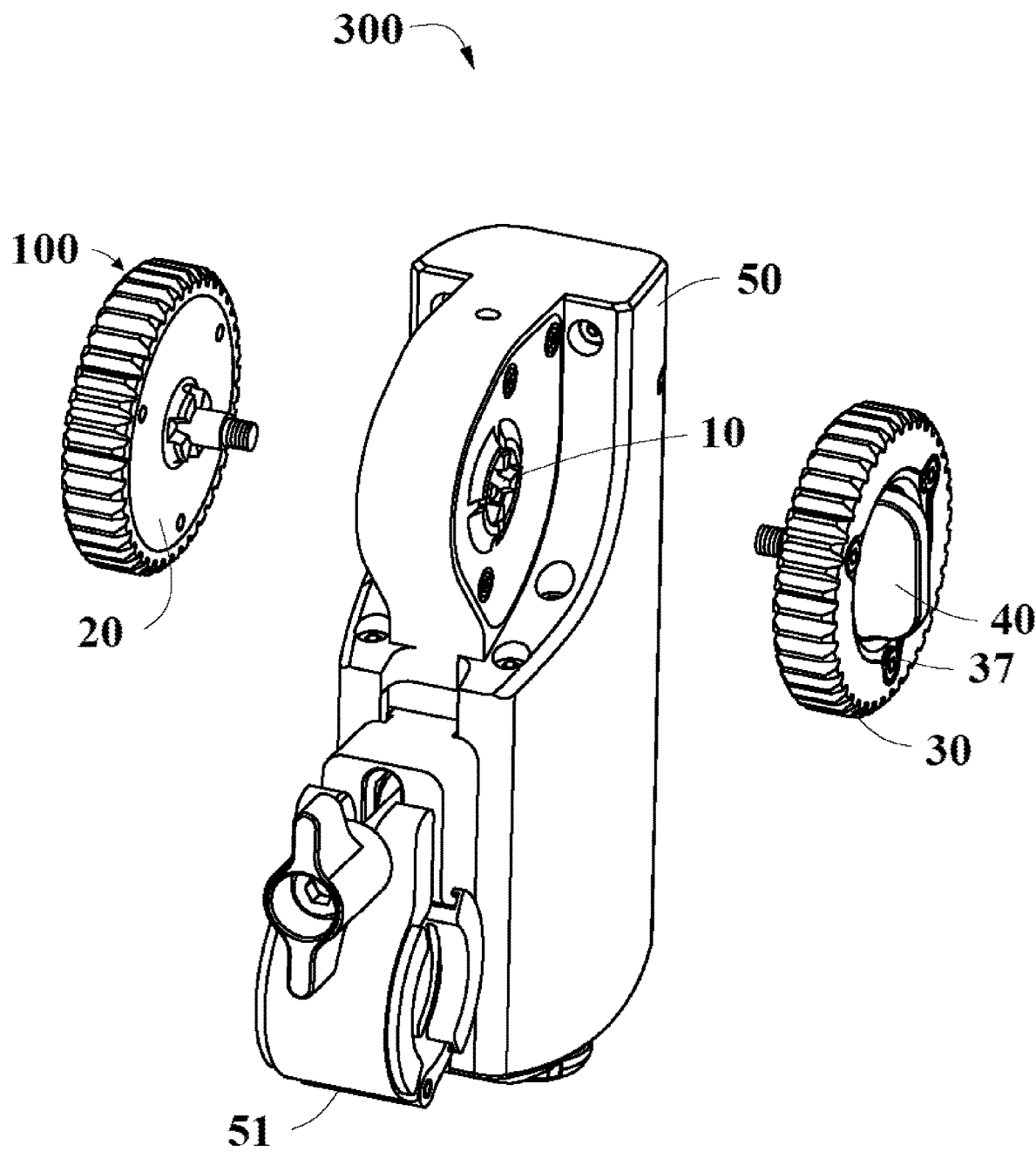
FIG. 13 shows a follow focus having the transmission mechanism of FIG. 1 in accordance with a second embodiment of the disclosure.

Referring to FIG. 13, a follow focus 300 in accordance with a second embodiment of the disclosure is shown. The follow focus 300 can be substantially similar to the follow focus 200, except that the follow focus 300 can comprise two output members 90. The two output members 90 can be detachably connected to the engaging portions 112 at two ends of the transmission shaft 11 of the adaptor 10 respectively through a locking member 40. The adaptor 10 can drive a synchronous rotation of the two holding members 20. The two clearing slots 52 can respectively accommodate the two holding members 20, the two output gears 30 and the two locking members 40.

Figure 14:
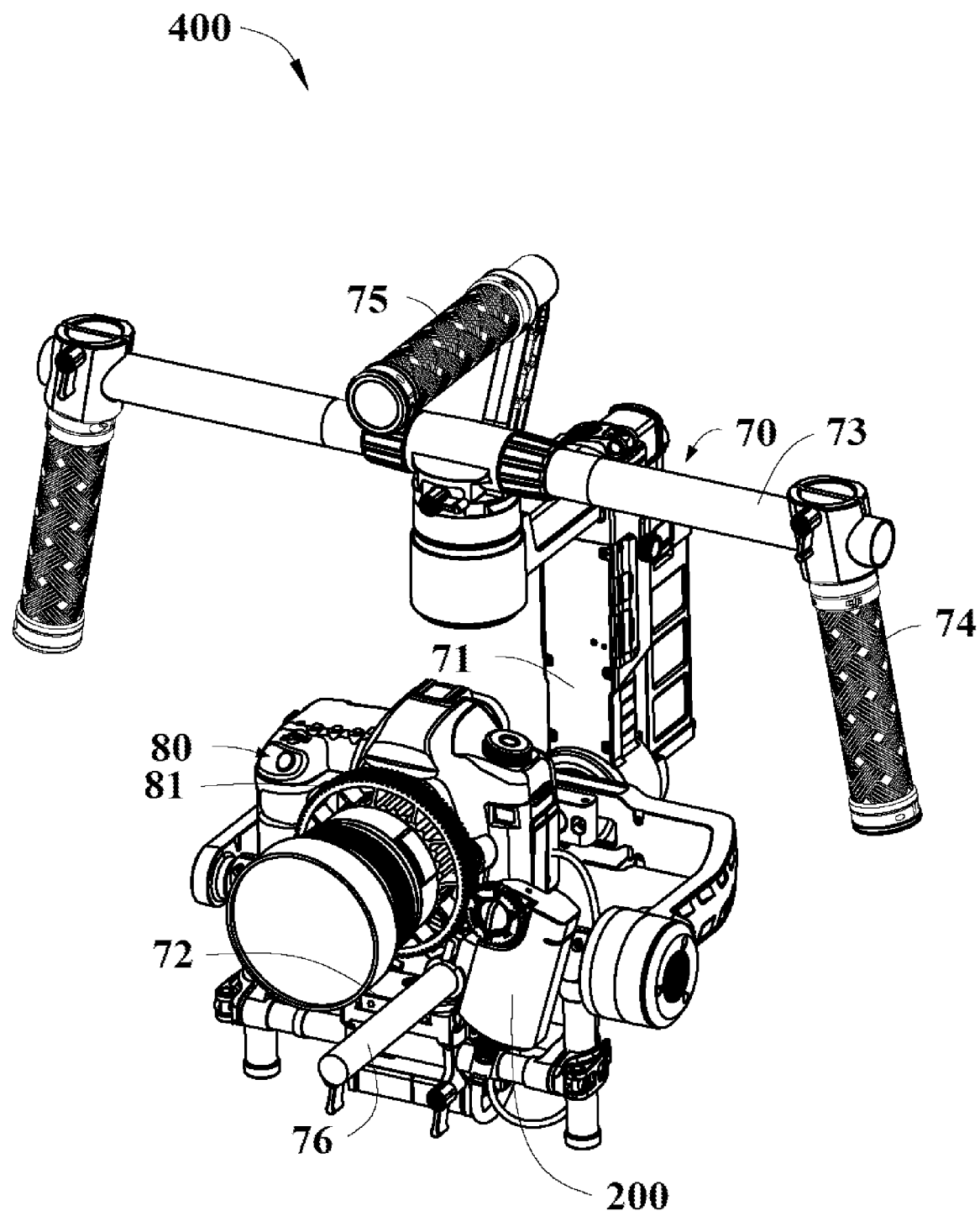
FIG. 14 shows an imaging device having the follow focus of FIG. 5 in accordance with embodiments of the disclosure.

Referring to FIG. 14, an imaging device 400 in accordance with embodiments of the disclosure can comprise a follow focus 200, a gimbal 70 and an imaging element 80. The imaging element 80 and the follow focus 200 can be provided on the gimbal 70. The follow focus 200 can drive a focusing of the imaging element 80. In some embodiments, the imaging element 80 can be a camera. It will be appreciated that, in other embodiments, the imaging element 80 can be other image capturing element such as a video camera. The gimbal 70 can be a carrier, and the imaging element 80 can be a load. The gimbal 70 can comprise a carrier 71, a carrying platform 72, a mounting rod 73, a first operating handle 74, a second operating handle 75 and a carrying rod 76. The carrying platform 72 and the mounting rod 73 can be provided on the carrier 71, and the imaging element 80 can be installed on the carrying platform 72. The first operating handle 74 and the second operating handle 75 can be connected to the mounting rod 73 and can facilitate a photographer to grip or a mounting to other parts. The carrying rod 76 can be connected to the carrying platform 72 and can be mounted in the receiving hole 514 of the latching member 51. The follow focus 200 can be detachably connected at an arbitrary position on the carrying rod 76 of the gimbal 70 through the latching member 51.

The follow focus 200 can comprise a gear ring 81 sleeved on a lens ring of the imaging element 80. A central axis of the gear ring 81 can be substantially perpendicular to a central axis of the output gear 30. The power device 60 can drive the transmission mechanism 100. The transmission mechanism 100 can drive a rotation of the gear ring 81 through the output gear 30 to rotate the lens ring of the imaging element 80, thereby a focusing is effected. It will be appreciated that, in other embodiments, the imaging device 400 can employ another type of follow focus such as the follow focus 300 in place of the follow focus 200. The follow focus 300 can drive the rotation of the lens ring of the imaging element 80 through the gear ring 81 to effect a focusing.

It will be appreciated that, the gear ring 81 can be sleeved directly on an aperture ring of the imaging element 80. The power device 60 can drive the transmission mechanism 100, and the transmission mechanism 100 can drive the rotation of the gear ring 81 through the output gear 30 to rotate the aperture ring of the imaging element 80, thereby an aperture adjustment is effected.

A control assembly (not shown) can be provided on the gimbal 70 of the imaging device 400. The control assembly can be provided on the carrying platform 72 which carries the imaging element 80. The control assembly can comprise a measuring part for detecting or obtaining status information associated with the imaging element 80. The status information can comprise a velocity, a direction, an attitude, a gravity, an acceleration, a position and/or a linear velocity and/or acceleration, a direction or an inclination angle. In some embodiments, the measuring part can comprise an inertial measurement unit (IMU). The IMU can comprise one or more of a gyroscope, a velocity sensor, an accelerometer, a magnetometer and the like. The control assembly can comprise a controller configured to calculate an attitude information associated with the imaging element 80 based upon a status information obtained by the measuring part. For example, the detected angle and/or linear acceleration of the imaging element 80 can be used to calculate an attitude information of the imaging element 80 about a pitch axis, a roll axis and a yaw axis of the gimbal 70. The controller can output one or more motor signals based upon the calculated attitude information of the imaging element 80. The gimbal 70 can comprise a motor assembly. The motor assembly can directly drive the gimbal 70 based upon the one or more motor signals to effect a rotation of the imaging element 80 about at least one of the pitch axis, the roll axis or the yaw axis of the gimbal 70, such that the imaging element 80 can be stabilized, and a quality of an image of an imaged object obtained by the imaging element 80 can be improved.

With the transmission mechanism, the follow focus, the follow focus actuator and the imaging device of the disclosure, the adaptor and the output member can be engaged with each other through a relative movement in an axial direction. The engagement can limit a relative rotation between the adaptor and the output member. The transmission mechanism can comprise a locking member rotatably provided on the output member. The locking member can pass through the output member along an axial direction of the output member. An operating portion provided on the locking member can be operated to connect the locking member to or disconnect the locking member from the adaptor, thereby a convenient attachment and/or detachment of the transmission mechanism is effected.

It will be appreciated that, numerous variations and substitutions will occur to those skilled in the art without departing from the scope of the disclosure. Those variations and substitutions made in accordance with the spirit of the disclosure are within the scope of the present disclosure.

What is claimed is:

1. A transmission mechanism comprising:
   an output member;
   a worm wheel shaft configured to be connected to a power device to transmit a power of the power device to the output member; and
   a locking member rotatably provided at the output member and passing through the output member along an axial direction of the output member; wherein:
   the worm wheel shaft and the output member are engaged with each other through a relative movement along an axial direction;
   an engagement between the worm wheel shaft and the output member limits a relative rotation between the worm wheel shaft and the output member;
   the locking member is operable to connect the locking member with the worm wheel shaft or disconnect the locking member from the worm wheel shaft; and
   a relative movement between the worm wheel shaft and the output member is limited when the locking member is connected with the worm wheel shaft.

2. The transmission mechanism of claim 1, wherein the worm wheel shaft comprises an engaging portion, the output member comprises a holding portion, and the engaging portion and the holding portion are configured to abut against each other to bring the transmission mechanism into an assembled state or to release from each other to bring the transmission mechanism into a disassembled state.

3. The transmission mechanism of claim 2, wherein the output member comprises:
   a holding member configured to abut against the worm wheel shaft to bring the transmission mechanism into the assembled state or to release from the worm wheel shaft to bring the transmission mechanism into the disassembled state; and
   an output gear connected to the holding member, the output member being configured to output the power to a load through the output gear.

4. The transmission mechanism of claim 3, wherein the holding portion is formed on the holding member.

5. The transmission mechanism of claim 3, wherein:
the engaging portion comprises a plurality of protruding blocks and a plurality of slots each formed between two adjacent ones of the protruding blocks;
the holding portion comprises a plurality of protrusions corresponding to the slots; and
the protrusions are configured to engage into the corresponding slots to cause the engaging portion to abut against the holding portion or to disengage from the corresponding slots to cause the engaging portion to release from the holding portion.

6. The transmission mechanism of claim 5, wherein the worm wheel shaft comprises a transmission shaft, the engaging portion is provided at an end of the transmission shaft, and the plurality of protruding blocks are arranged along a circumference of an end face of the transmission shaft.

7. The transmission mechanism of claim 6, wherein:
the engaging portion is a first engaging portion; and
the worm wheel shaft further includes a second engaging portion provided at another end of the transmission shaft.

8. The transmission mechanism of claim 6, wherein the locking member passes through the output gear and the holding member and is configured to be threadedly connected to the worm wheel shaft to abut the holding member against the worm wheel shaft or to be disconnected from the worm wheel shaft to release the holding member from the worm wheel.

9. The transmission mechanism of claim 8, wherein the locking member comprises a connecting rod configured to be threadedly connected to the transmission shaft to cause the holding member to abut against the worm wheel shaft or to be disconnected from the transmission shaft to cause the holding member to release from the worm wheel shaft.

10. The transmission mechanism of claim 9, wherein:
the transmission shaft includes an accommodating hole and a collar extending from a position at a middle of an inner wall of the accommodating hole; and
the worm wheel shaft is threadedly connected to or disconnected from the connecting rod through the collar.

11. The transmission mechanism of claim 10, wherein a thread is formed on a surface of the collar facing a central axis of the transmission shaft.

12. The transmission mechanism of claim 8, wherein:
the output gear includes a through hole and a groove in communication with the through hole;
the holding member is mounted within the groove and includes a via hole; and
the locking member is configured to pass through the through hole and the via hole to protrude from the holding member.

13. The transmission mechanism of claim 12, wherein the plurality of protrusions are arranged along a circumference of the via hole and spaced apart from each other.

14. The transmission mechanism of claim 12, wherein:
the holding member includes a guide hole; and
a rib is fixed at a bottom surface of the groove facing the holding member, the rib being configured to be inserted into the guide hole to guide a connection between the output gear and the holding member.

15. The transmission mechanism of claim 3, wherein the output gear comprises a meshing portion, the output gear being configured to drive the load to rotate through the meshing portion.

16. A follow focus actuator comprising:
a casing;
a power device; and
a transmission mechanism connected to the casing and configured to transmit a power of the power device, the transmission mechanism comprising:
an output member;
a worm wheel shaft connected to the power device to transmit the power of the power device to the output member; and
a locking member rotatably provided at the output member and passing through the output member along an axial direction of the output member;
wherein:
the worm wheel shaft and the output member are engaged with each other through a relative movement along an axial direction;
an engagement between the worm wheel shaft and the output member limits a relative rotation between the worm wheel shaft and the output member;
the locking member is operable to connect the locking member with the worm wheel shaft or disconnect the locking member from the worm wheel shaft; and
a relative movement between the worm wheel shaft and the output member is limited when the locking member is connected with the worm wheel shaft.

17. An imaging device comprising:
a gimbal;
an imaging element provided at the gimbal; and
a follow focus actuator provided at the gimbal and comprising:
a casing;
a power device; and
a transmission mechanism connected to the casing and configured to transmit a power of the power device, the transmission mechanism comprising:
an output member;
a worm wheel shaft connected to the power device to transmit the power of the power device to the output member; and
a locking member rotatably provided at the output member and passing through the output member along an axial direction of the output member;
wherein:
the worm wheel shaft and the output member are engaged with each other through a relative movement along an axial direction;
an engagement between the worm wheel shaft and the output member limits a relative rotation between the worm wheel shaft and the output member;
the locking member is operable to connect the locking member with the worm wheel shaft or disconnect the locking member from the worm wheel shaft; and
a relative movement between the worm wheel shaft and the output member is limited when the locking member is connected with the worm wheel shaft.

\* \* \* \* \*